United States Patent
Yao

(10) Patent No.: US 8,120,881 B2
(45) Date of Patent: Feb. 21, 2012

(54) HEAD GIMBAL ASSEMBLY AND MANUFACTURING METHOD THEREOF, AND DISK DRIVE DEVICE WITH THE SAME

(75) Inventor: MingGao Yao, Dongguan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 886 days.

(21) Appl. No.: 12/213,102

(22) Filed: Jun. 13, 2008

(65) Prior Publication Data
US 2009/0284871 A1 Nov. 19, 2009

(30) Foreign Application Priority Data
May 13, 2008 (CN) .......................... 2008 1 0100402

(51) Int. Cl.
*G11B 5/48* (2006.01)
(52) U.S. Cl. .................................................. 360/294.4
(58) Field of Classification Search ............... 360/294.4
See application file for complete search history.

(56) References Cited

U.S. PATENT DOCUMENTS

| | | | | |
|---|---|---|---|---|
| 6,724,580 | B2 * | 4/2004 | Irie et al. ................... | 360/294.4 |
| 7,403,357 | B1 * | 7/2008 | Williams ................... | 360/245.9 |
| 2001/0046107 | A1 * | 11/2001 | Irie et al. ................... | 360/294.4 |

* cited by examiner

*Primary Examiner* — Mark Blouin
(74) *Attorney, Agent, or Firm* — Nixon & Vanderhye PC

(57) ABSTRACT

A HGA includes a suspension, a seed layer formed on a PZT holding region of a flexure of the suspension and a piezoelectric element deposited on the seed layer. The piezoelectric element is electrically connected with the suspension to form a PZT micro-actuator. The present invention simultaneously conducts the manufacture, mechanical assembly and electrical connection of the piezoelectric element and suspension, thus the present invention has simple operation process and short process time, high manufacture yield, sound mechanical, dynamic and static performance. In addition, the present invention firstly forms the seed layer on the flexure and secondly forms the piezoelectric element on the seed layer, wherein the seed layer is metallic material, metal oxide, non-metallic material, or inorganic salt, the seed layer enables to easily control the operation and assists to improve the performance of the HGA. Besides, the electrical connection between the piezoelectric element and the suspension could be performed by sputtering process, printing process, or plating process, thus the present invention has a less difficulty to operate and sound connection reliability. The present invention also discloses a method for manufacturing the HGA and a disk drive unit.

18 Claims, 19 Drawing Sheets

HEAD GIMBAL ASSEMBLY AND MANUFACTURING METHOD THEREOF, AND DISK DRIVE DEVICE WITH THE SAME

FIELD OF THE INVENTION

The present invention relates to an information recording disk drive device and, more particularly, to a head gimbal assembly (HGA) and manufacturing method for the head gimbal assembly.

BACKGROUND OF THE INVENTION

Disk drives are information storage devices that use magnetic media to store data and a movable read/write head positioned over the magnetic media to selectively read data from and write data to the magnetic media.

Consumers are constantly desiring greater storage capacity for such disk drive devices, as well as faster and more accurate reading and writing operations. Thus, disk drive manufacturers have continued to develop higher capacity disk drives by, for example, increasing the recording and reproducing density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult to quickly and accurately position the read/write head over the desired information tracks on the disk. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a voice coil motor (VCM). Referring to FIG. 1a, a conventional disk drive device using VCM typically has a drive arm 104, a HGA 106 attached to and mounted on the drive arm 104, a stack of magnetic disks 101 and a spindle motor 102 for spinning the disks 101. The employed VCM is for controlling the motion of the drive arm 104 and, in turn, controlling a slider 103 of the HGA 106 to position with reference to data tracks across the surface of the magnetic disk 101, thereby enabling the read/write head imbedded in the slider 103 to read data from or write data to the disk 101. However, because the inherent tolerances of the VCM 105 and the HGA 106 exist in the displacement of the slider 103 by employing VCM 105 alone, the slider 103 cannot achieve quick and fine position control which adversely impacts the ability of the read/write head to accurately read data from and write data to the disk 101.

In order to solve the problem, an additional actuator, for example a PZT (piezoelectric) micro-actuator, is introduced in the disk drive device in order to modify the displacement of the slider 103. The PZT micro-actuator corrects the displacement of the slider 103 on a much smaller scale, as compared to the VCM, in order to compensate for the resonance tolerance of the VCM and/or the HGA. The micro-actuator 105 enables, for example, the use of a smaller recording track pitch, and can increase the "tracks-per-inch" (TPI) value by 50% for the disk drive unit, as well as provide an advantageous reduction in the head seeking and settling time. Thus, the PZT micro-actuator enables the disk drive device to have a significant increase in the surface recording density of the information storage disks used therein.

Referring to FIGS. 1a and 1b, the PZT micro-actuator has two piezoelectric elements 107. The piezoelectric elements 107 are mounted within the HGA 106. The HGA 106 includes a suspension 110 to support the slider 103 and the piezoelectric elements 107. The suspension 110 comprises a flexure 111, a slider support 112 with a bump 112a formed thereon, a metal base 113 and a load beam 114 with a dimple 114a formed thereon. The slider 103 is partially mounted on the slider support 112 with the bump 112a supporting the center of the back surface of the slider 103. Specifically, the flexure 111 provides a plurality of traces thereon. The traces of the flexure 111 couple the slider support 112 and the metal base 113. Referring to FIG. 1c, the flexure 111 forms a slider mounting region 111a for positioning the slider 103 and a tongue region 111a for positioning the two piezoelectric elements 107 of the micro-actuator. FIG. 1d shows that the slider 103 and the two piezoelectric elements 107 are mounted on the flexure 111. Specifically, the slider 103 is mounted on the slider mounting region 111a of the flexure 111, and the piezoelectric elements 107 are mechanically mounted on the tongue region 111b of the flexure 111 via epoxy. The piezoelectric elements 107 forms pads 101b, 102b and 103b, wherein pad 101b, 103b are respectively formed on the left, right element of the piezoelectric elements 107 and the pad 102b is a common pad of the two piezoelectric elements 107. The suspension 110 forms pads 101a, 102a, 103a at positions thereof corresponding to pads 101b, 102b and 103b of the piezoelectric elements 107, wherein the pad 102 of the suspension 110 is grounded. The piezoelectric elements 107 are electrically connected with the suspension 110. Specifically, the pads 101b, 102b, 103b of the piezoelectric elements 107 are respectively and electrically connected with the pads 101a, 102a, 103a of the suspension 110 via metal material such as wires 101, 102, 103. Referring to FIG. 1e, when a voltage is input to the two piezoelectric elements 107 of the PZT micro-actuator, one of the piezoelectric elements may contract as shown by arrow D while the other may expand as shown by arrow E. This will generate a rotation torque that causes the slider support 112 to rotate in the arrowed direction C and, in turn, makes the slider 103 move on the disk. In such case, the dimple 114a of the load beam 114 works with the bump 112a of the slider support 112, that is, the slider 103 together with the slider support 112 rotates against the dimple 114a, which keeps the load force from the load beam 114 evenly applying to the center of the slider 103, thus ensuring the slider 103 a good fly performance, supporting the head with a good flying stability.

However, the piezoelectric elements 107 and the suspension 110 of the prior art are both manufactured separately via individual process and individual factory, and the piezoelectric elements 107 are mechanically and electrically connected to the suspension 110 via assembly procedure. Such manufacturing process is extremely complex, and the head gimbal assembly manufactured has a low manufacture yield, a poor work performance and a long process time. First, as the piezoelectric elements 107 are thin film piezoelectric elements which possess a thickness of about 1~10 um and are terribly fragile, thus the piezoelectric elements 107 are very easy to deform to result in damage, thereby the piezoelectric element mounting operation is quite difficult. Besides, as mechanically mounting piezoelectric elements 107 to the tongue region 111b of the flexure 111 is accomplished by bonding adhesive, thus the control of adhesive (such as adhesive viscosity, adhesive strength and adhesive thickness, etc) is very difficult, and as the amount of adhesive could affect mechanical performance, dynamic performance and static performance of the head gimbal assembly, such as displacement performance and resonance performance, thus the thickness and volume of the adhesive must be appropriate, which adds more difficulty in controlling adhesive' amount during piezoelectric element mounting process. Moreover, as the connection position of the piezoelectric elements 107 and the suspension 110 is at the tongue region 111b of the flexure 111, and the electrical connection is performed by welding, thus the welding operation is of great difficulty, and accordingly, the head gimbal assembly results in a low manufacture yield, a long time consumption, and a low connection reliability.

Hence, it is desired to provide an improved method for manufacturing a head gimbal assembly and a head gimbal assembly manufactured by the method, and a disk drive unit to solve the above-mentioned problems.

SUMMARY OF THE INVENTION

Accordingly, an object of the present invention is to provide a method for manufacturing a head gimbal assembly. The method shall not employ adhesive to bond piezoelectric elements with a suspension and shall not be required to electrically connect the piezoelectric element with the suspension by individual procedure while manufacturing the head gimbal assembly. The present method is easy to control the operation and has a simple manufacture process. Besides, the method avoids separate-manufactured piezoelectric element deformation problem during mounting operation because of fragile property of the piezoelectric element, and the head gimbal assembly manufactured by the method has high manufacture yield, and sound mechanical, dynamic and static performance.

Another object of the present invention is to provide a head gimbal assembly with sound mechanical, dynamic and static performance.

Another object of the present invention is to provide a disk drive unit, and the disk drive unit possesses sound mechanical, dynamic and static performance.

According to an aspect of the present invention, the head gimbal assembly comprises a suspension, a seed layer and a piezoelectric element. The suspension has a flexure and the flexure forms a PZT holding region thereon. The seed layer is formed on the PZT holding region, and the seed layer is metallic material metal oxide, non-metallic material or inorganic salt. The piezoelectric element is deposited on the seed layer, and the piezoelectric element is electrically connected with the suspension to form a PZT micro-actuator.

As an embodiment of the present invention, the piezoelectric element comprises a single-layer laminated structure, and the single-layer laminated structure has a first electrode layer formed on the seed layer, a piezoelectric layer formed on the first electrode layer and a second electrode layer formed on the piezoelectric layer. Preferably, the surface of the single-layer laminated structure is covered with a protective layer, and the protective layer is polymer.

As another embodiment of the present invention, the piezoelectric element comprises a multi-layer laminated structure, and the multi-layer laminated structure is formed by laminating electrode layers and piezoelectric layers alternately. Preferably, the multi-layer laminated structure is covered with a protective layer, and the protective layer is polymer.

Preferably, the metallic material is nickel, titanium or strontium, the metal oxide is nickel oxide, titanium oxide or strontium oxide, the non-metallic material is monocrystaline silicon, and the inorganic salt is silicate.

Preferably, the seed layer is formed by anyone of the following ways: (a) chemical deposition; (b) sputtering process; (c) printing process; (d) plating process.

Preferably, the piezoelectric element is electrically connected with the suspension via sputtering process, printing process or plating process Alternatively, the suspension further comprises a load beam and a base plate, and the flexure, the load beam and the base plate are welded together via laser.

According to another aspect of the present invention, the method for manufacturing a head gimbal assembly comprises steps of: (1) providing a suspension, the suspension having a flexure, and the flexure forming a PZT holding region; (2) forming a seed layer on the PZT holding region of the flexure; (3) forming a first electrode layer on the seed layer; (4) forming a piezoelectric layer on the first electrode layer; (5) forming a second electrode layer on the piezoelectric layer, the first electrode layer, the piezoelectric layer and the second electrode layer being forming a laminated structure; and (6) electrically and respectively connecting the first electrode layer and the second electrode layer with the suspension.

Preferably, the seed layer is metallic material, metal oxide or non-metallic material or inorganic salt. Preferably, the metallic material is nickel, titanium or strontium, the metal oxide is nickel oxide, titanium oxide or strontium oxide, the non-metallic material is monocrystaline silicon, the inorganic salt is silicate.

Preferably, the seed layer, the first electrode layer, the piezoelectric layer and the second electrode layer in steps (2)-(5) are formed by anyone of the following steps: (a) chemical deposition; (b) sputtering process; (c) printing process; (d) plating process.

Alternatively, between the step (5) and the step (6) further comprises steps of: covering the surface of the laminated structure with a polymer protective layer; respectively forming an electrical pad on the first electrode layer and the second electrode layer and making all the electrical pads extend out of the protective layer, and wherein the step (6) is performed by electrically connecting the electrical pads with the suspension via sputtering process, printing process, or plating process.

As an embodiment of the present invention, the PZT holding region comprises a left PZT holding region and a right PZT holding region, the left and the right PZT holding regions both form the seed layer, the first electrode layer, the piezoelectric layer and the second electrode layer, a left electrical connection pad is formed on the left PZT holding region, a right electrical connection pad is formed on the right PZT holding region, a common ground pad is formed between the left PZT holding region and the right PZT holding region, the connection in step (6) is performed by: connecting the electrical pad of the first electrode layer on the left PZT holding region with the left electrical connection pad; connecting the electrical pad of the first electrode layer on the right PZT holding region with the right electrical connection pad; connecting the electrical pads of the two second electrode layers on the left and the right PZT holding regions with the common ground pad.

As another embodiment of the present invention, the PZT holding region comprises a left PZT holding region and a right PZT holding region, the left and the right PZT holding regions both form the seed layer, the first electrode layer, the piezoelectric layer and the second electrode layer, a left electrical connection pad is formed on the left PZT holding region, a right electrical connection pad is formed on the right PZT holding region, the connection in step (6) is performed by: connecting the electrical pad of the first electrode layer on the left PZT holding region with the left electrical connection pad; connecting the electrical pad of the first electrode layer on the right PZT holding region with the right electrical connection pad; connecting the electrical pads of the two second electrode layers on the left and the right PZT holding regions together.

Alternatively, between the step (5) and step (6) further comprises steps of: (51) forming a second piezoelectric layer on the second electrode layer; (52) forming a fourth electrode layer on the second piezoelectric layer, the step (6) further comprises: electrically connecting the fourth electrode layer with the suspension.

Alternatively, between the step (5) and step (6) further comprises steps of: (51) covering the second electrode layer with an adhesive layer; (52) forming a third electrode layer on the adhesive layer; (52) forming a second piezoelectric layer on the third electrode layer; (53) forming a fourth electrode layer on the second piezoelectric layer, the third electrode layer, the second piezoelectric layer and the fourth electrode layer also forming a laminated structure, the step (6) further comprises: electrically connecting the third electrode layer and the fourth electrode layer with the suspension.

Preferably, between the step (5) and the step (6) further comprises steps of: covering the surface of the laminated structure with a polymer protective layer; respectively forming an electrical pad on the first, the second, the third and the fourth electrode layers, wherein all the electrical pads are offset a predetermined distance therebetween and extend out of the protective layer, and the step (6) is performed by electrically connecting the electrical pads with the suspension via sputtering process, printing process, or plating process.

As an embodiment of the present invention, the PZT holding region comprises a left PZT holding region and a right PZT holding region, the left and the right PZT holding regions both form the seed layer, the first electrode layer, the first piezoelectric layer, the second electrode layer, the third electrode layer, the second piezoelectric layer and the fourth electrode layer, a left electrical connection pad is formed on the left PZT holding region, a right electrical connection pad is formed on the right PZT holding region, a common ground pad is formed between the left PZT holding region and the right PZT holding region, the connection in step (6) is performed by: connecting the electrical pads of the first and the fourth electrode layers on the left PZT holding region with the left electrical connection pad, connecting the electrical pads of the first and the fourth electrode layers on the right PZT holding region with the right electrical connection pad, connecting the electrical pads of the two pairs of the second and the third electrode layers on the left and the right PZT holding region with the common ground pad.

As another embodiment of the present invention, the PZT holding region comprises a left PZT holding region and a right PZT holding region, the left and the right PZT holding regions both form the seed layer, the first electrode layer, the first piezoelectric layer, the second electrode layer, the third electrode layer, the second piezoelectric layer and the fourth electrode layer, a left electrical connection pad is formed on the left PZT holding region, a right electrical connection pad is formed on the right PZT holding region, the connection in step (6) is performed by: connecting the electrical pads of the first and the fourth electrode layers on the left PZT holding region with the left electrical connection pad, connecting the electrical pads of the first and the fourth electrode layers on the right PZT holding region with the right electrical connection pad, connecting the electrical pads of the two pairs of the second and the third electrode layers on both the left and the right PZT holding regions together.

Preferably, the method for manufacturing a head gimbal assembly further comprises welding the flexure with a load beam and a base plate via laser.

A disk drive unit comprises a head gimbal assembly, a drive arm connected to the head gimbal assembly, a disk and a spindle motor to spin the disk. The head gimbal assembly comprises a suspension, a seed layer and a piezoelectric element. The suspension has a flexure and the flexure forms a PZT holding region thereon. The seed layer is formed on the PZT holding region, and the seed layer is metallic material, metal oxide, non-metallic material or inorganic salt. The piezoelectric element is deposited on the seed layer, and the Piezoelectric element is electrically connected with the suspension to form a PZT micro-actuator.

In comparison with the prior art, the present invention simultaneously performs manufacture of the piezoelectric element and the suspension, mechanical mounting and electrical connection between the piezoelectric element and the suspension during manufacturing process of the head gimbal assembly, thus the suspension and the piezoelectric element do not need to be manufactured via individual process and individual factory, and the mechanical mounting and electrical connection between the piezoelectric element and the suspension do not need individual procedure, thereby significantly reducing process time. In addition, the present invention firstly introduces the seed layer with metallic material, metal oxide, non-metallic material or inorganic salt and secondly forms the piezoelectric element on the seed layer. Comparing to the way of connecting the separate-manufactured piezoelectric element with the suspension by adhesive in the prior art, the present invention is easy to control the operation and has a simple manufacturing process. In addition, the present invention avoids the separate-manufactured piezoelectric element deformation problem during mounting operation because of fragile property of the piezoelectric element, and the head gimbal assembly manufactured by the present method has high manufacture yield, and sound mechanical, dynamic and static performance. Besides, the electrical connection between the piezoelectric element and the suspension of the head gimbal assembly of the present invention could be performed by sputtering process, printing process or plating process, comparing to the welding of the prior art, the present invention has short process time and sound connection reliability.

Other aspects, features, and advantages of this invention will become apparent from the following detailed description when taken in conjunction with the accompanying drawings, which are a part of this disclosure and which illustrate by way of example, principles of this invention.

BRIEF DESCRIPTION OF THE DRAWINGS

The accompanying drawings facilitate an understanding of the various embodiments of this invention. In such drawings:

FIG. 1b is an exploded, perspective view of a head gimbal assembly of the disk drive unit shown in FIG. 1a;

FIG. 2b is an exploded, perspective view of the head gimbal assembly shown in FIG. 2a;

FIG. 3b is a sectional view of the flexure taken along line A-A shown in FIG. 3a;

FIG. 5b is a partial, perspective view of establishing electrical connection between an electrical pad of a piezoelectric element and a common ground pad of the suspension of FIG. 5a;

FIG. 6a is an electrical connection relation view of the two piezoelectric elements of FIG. 5a;

FIG. 6c is another electrical connection relation view of the two piezoelectric elements of FIG. 5a;

DETAILED DESCRIPTION OF ILLUSTRATED EMBODIMENTS

Figure 1A:
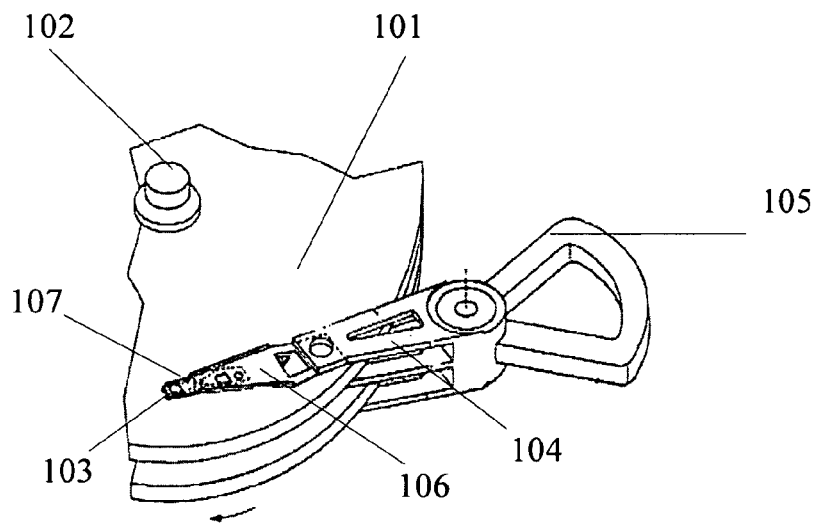
FIG. 1a is a perspective view of a conventional disk drive unit.
Figure 1B:
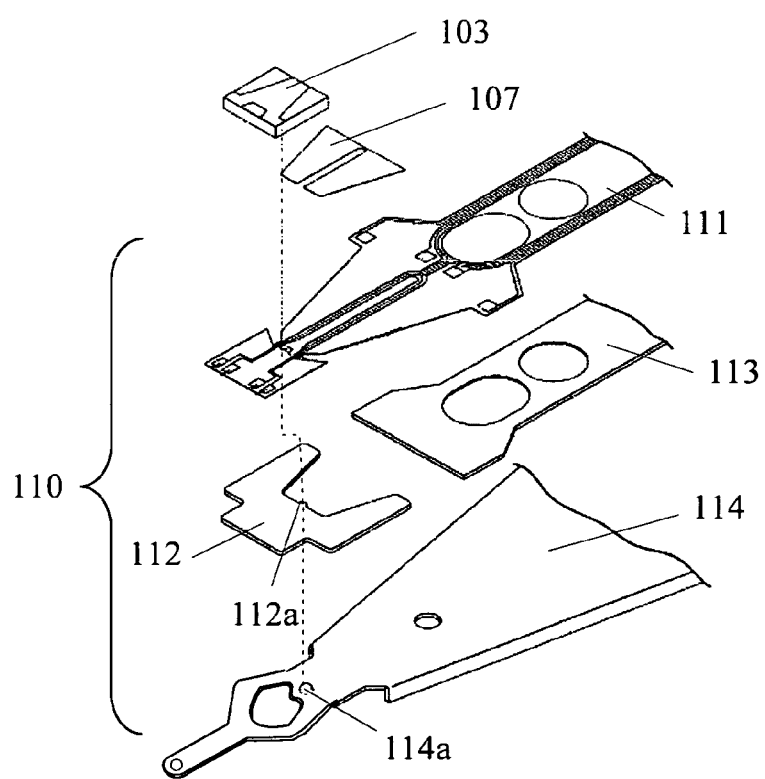
Figure 1C:
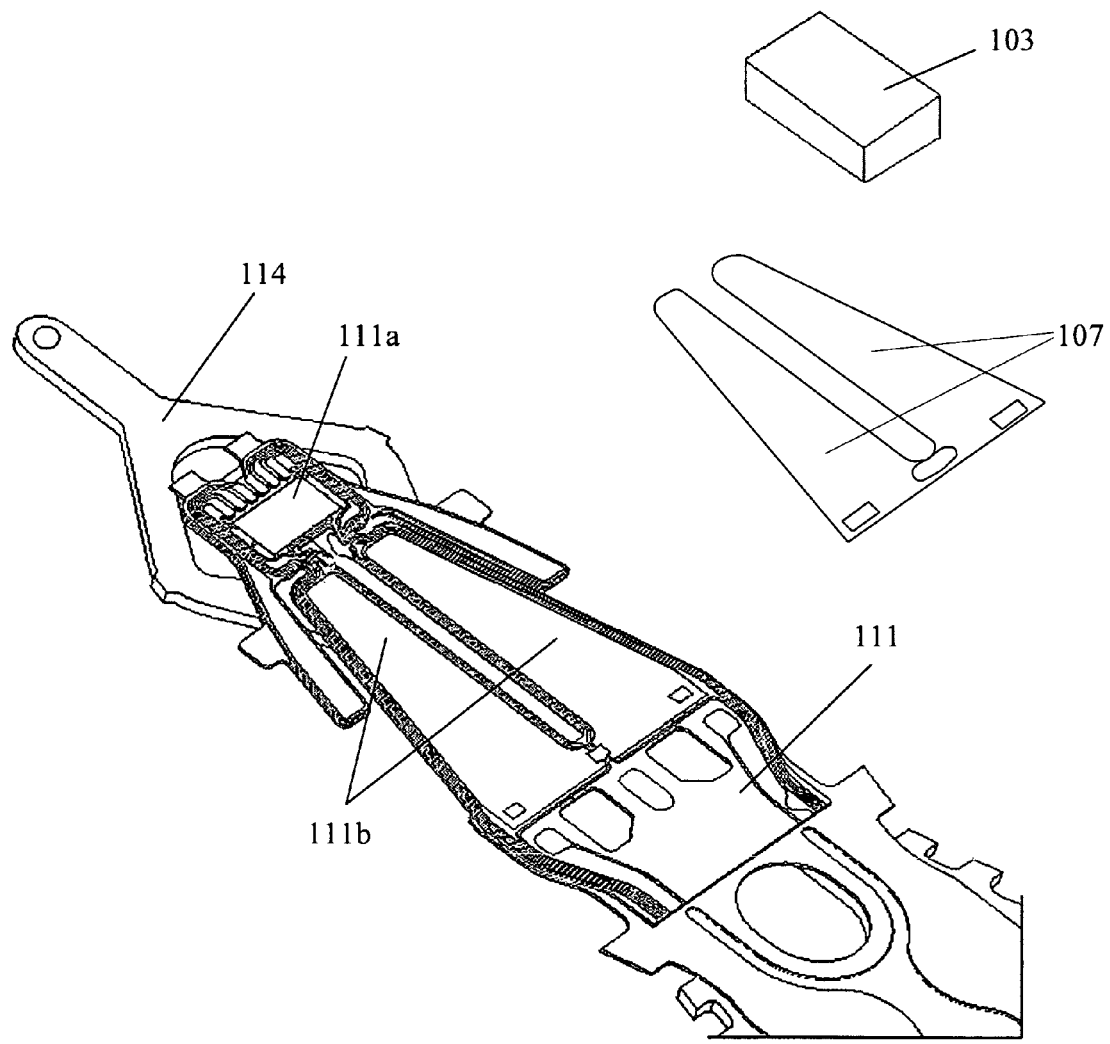
FIG. 1c shows a slider, a micro-actuator and mounting regions of the micro-actuator on the suspension of the head gimbal assembly shown in FIG. 1b.
Figure 1D:
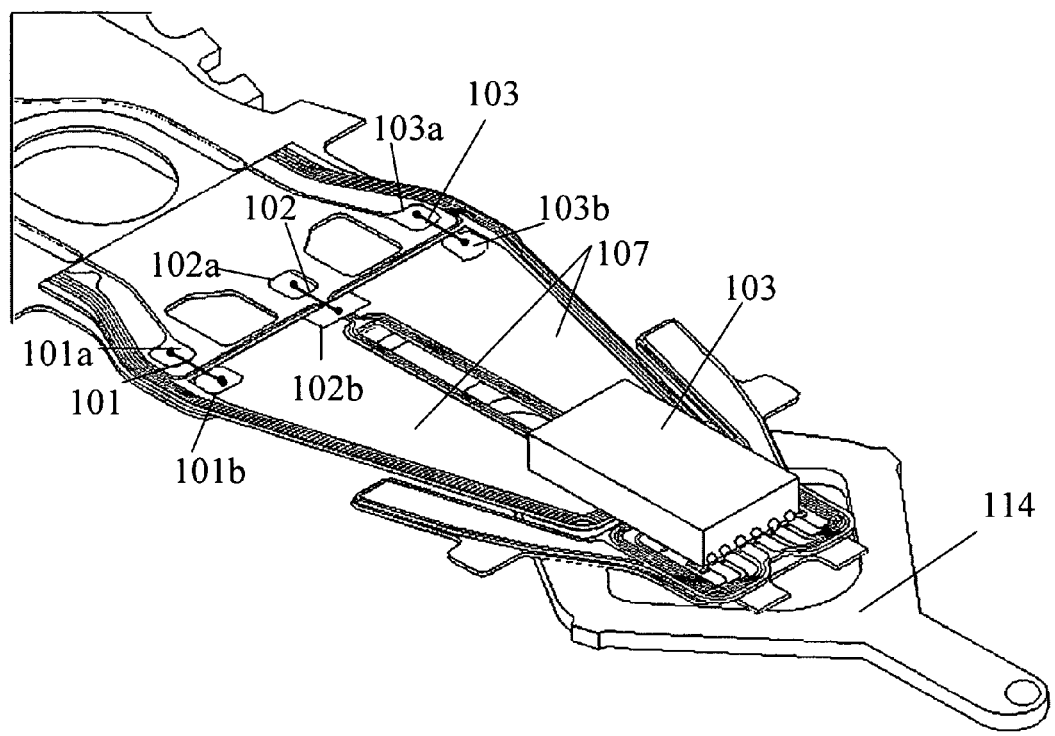
FIG. 1d is a view of the slider and the micro-actuator mounting on the suspension of FIG. 1c, specifically showing the electrical connection relation between the micro-actuator and the suspension.
Figure 1E:
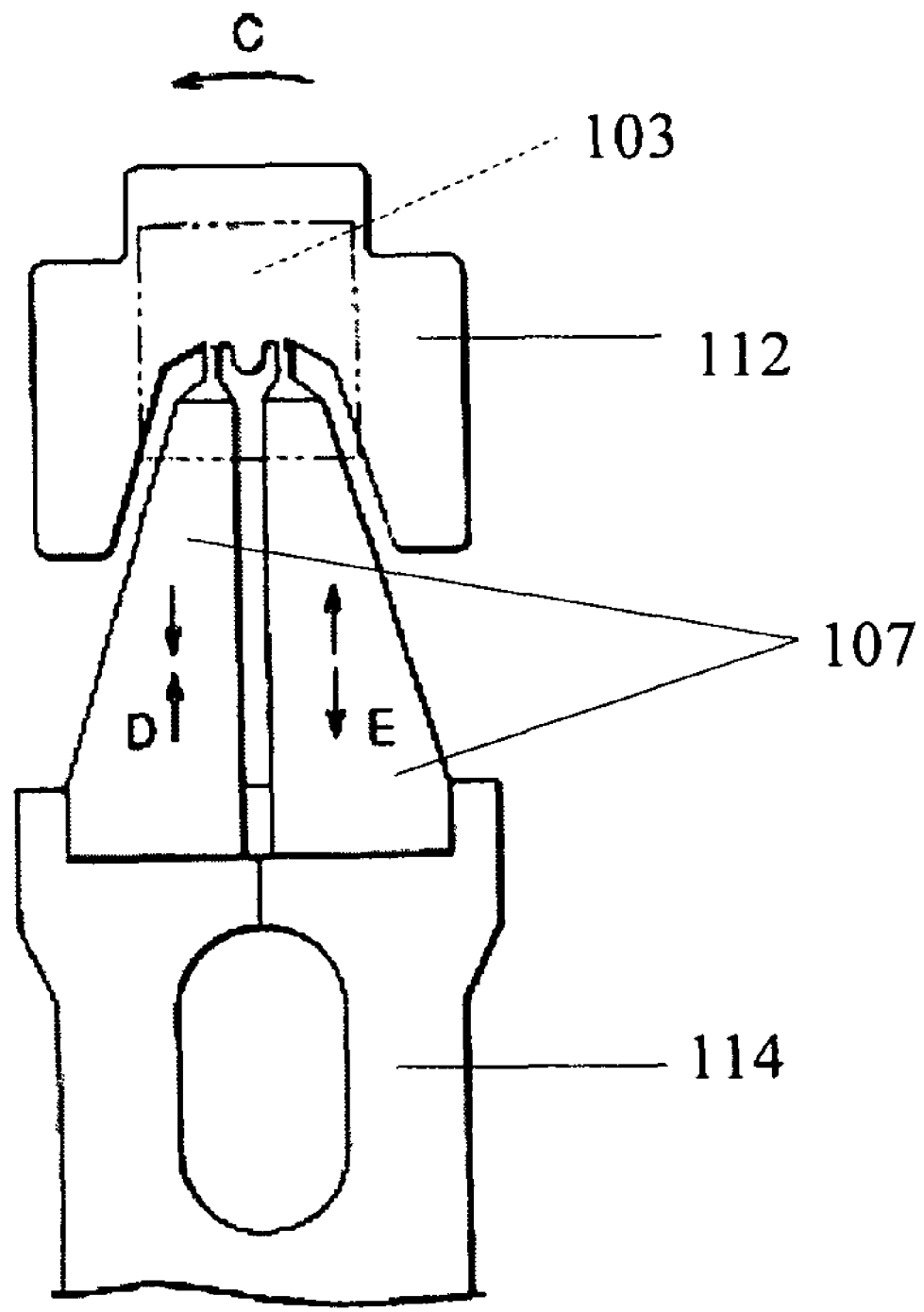
FIG. 1e illustrates the operation principle of the head gimbal assembly of FIG. 1b.
Figure 2A:
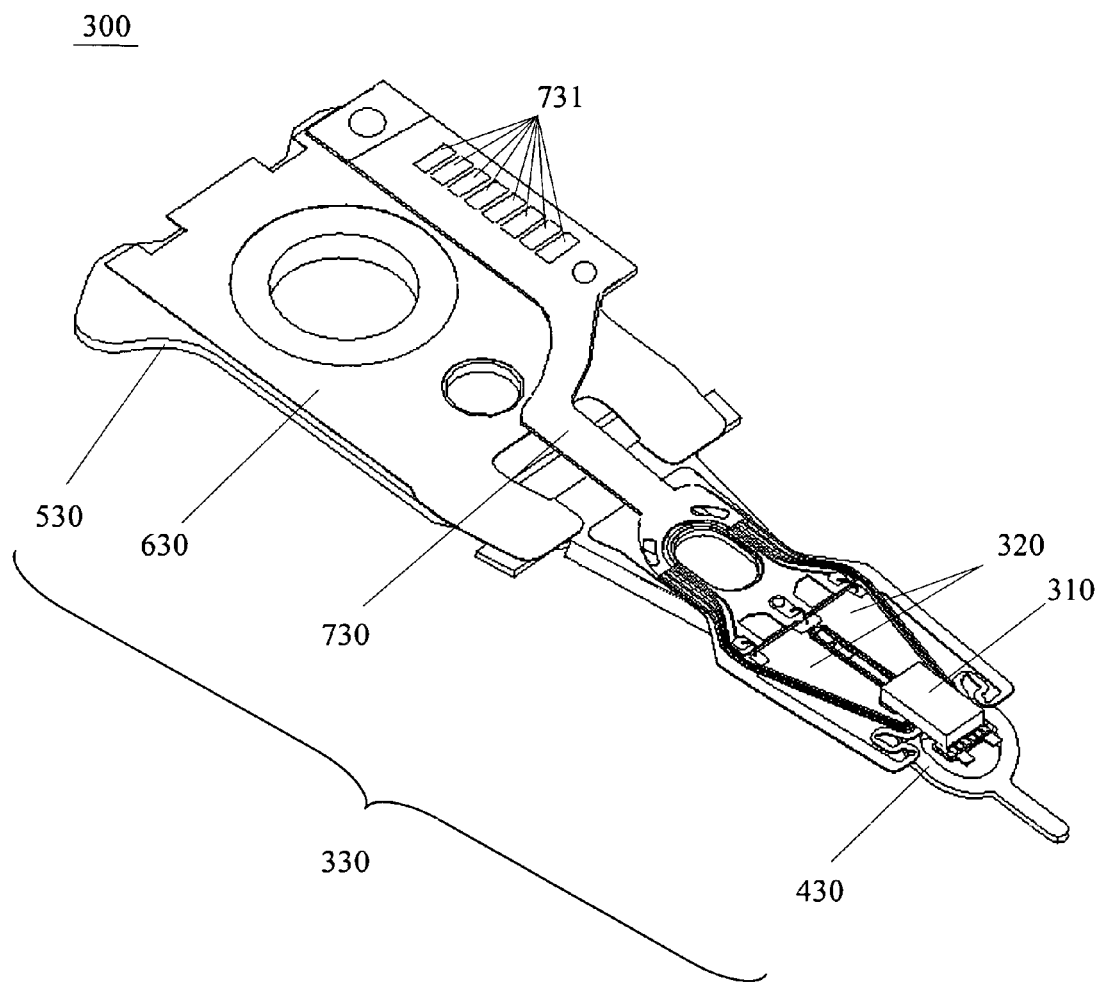
FIG. 2a is an assembled, perspective view of a head gimbal assembly according to the present invention.
Figure 2B:
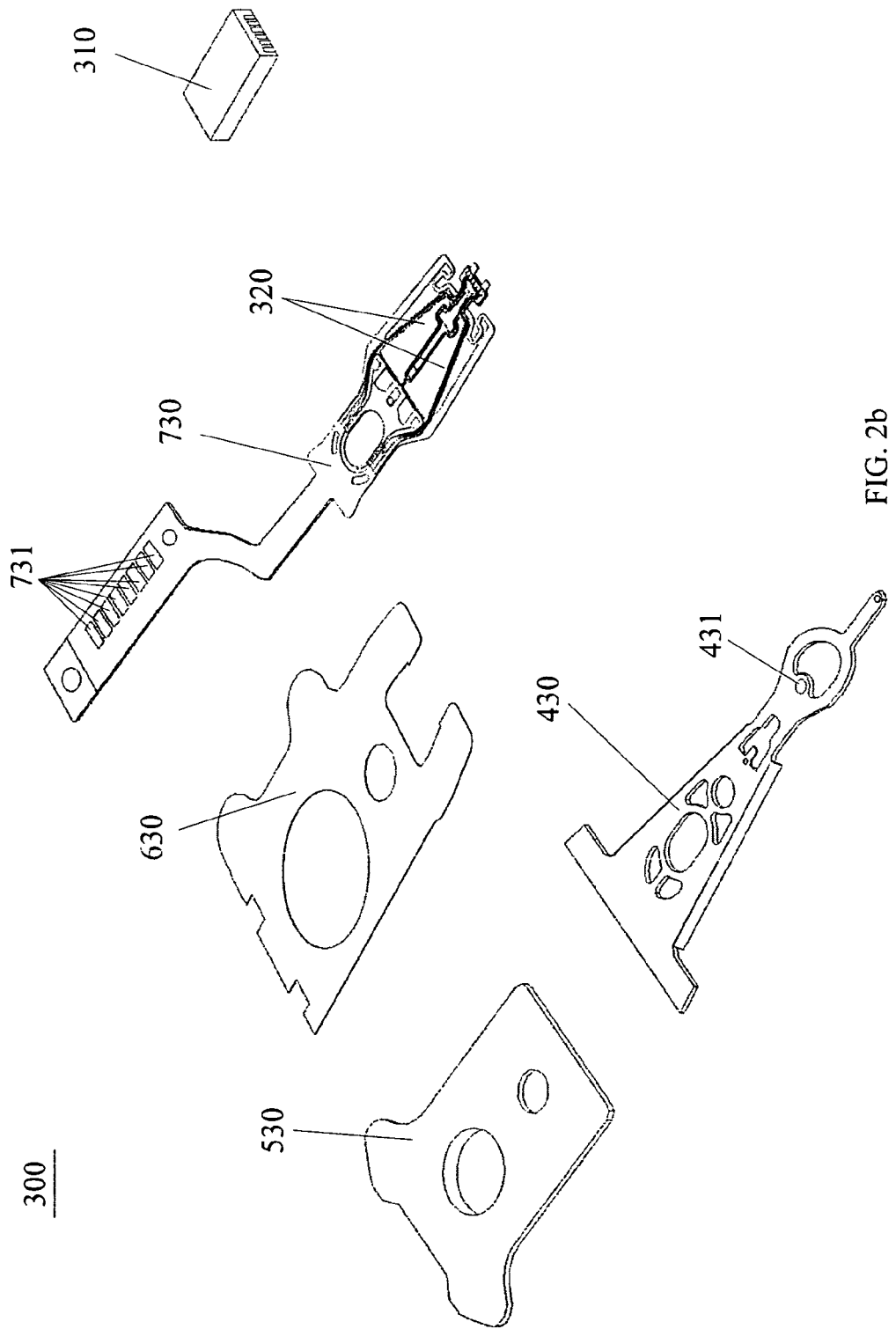

Various preferred embodiments of the invention will now be described with reference to the figures, wherein like reference numerals designate similar parts throughout the various views. As illustrated, the present invention is provided a head gimbal assembly and a method for manufacturing the head gimbal assembly. FIGS. 2a-9 illustrate a first embodiment of a head gimbal assembly 300 of the present invention. Referring to FIGS. 2a-2b, the head gimbal assembly 300 mainly comprises a slider 310, a suspension 330 to support the slider and a micro-actuator 320 with a piezoelectric layer formed on the suspension 330. The suspension 330 comprises a load beam 430, a base plate 530, a hinge 630 and a flexure 730, which are assembled together. In the embodiment, the flexure 730, the load beam 430, the base plate 530 are welded together via laser. The flexure 730 provides a plurality of suspension pads 731, and the suspension pads 731 are connected to a control system. In order to keep the load force from the load beam 430 evenly applying to the slider 310, the load beam 430 provides a main dimple 431 (shown in FIG. 9) to support a position of a tongue region of the flexure 730 for mounting the slider.

Figure 3A:
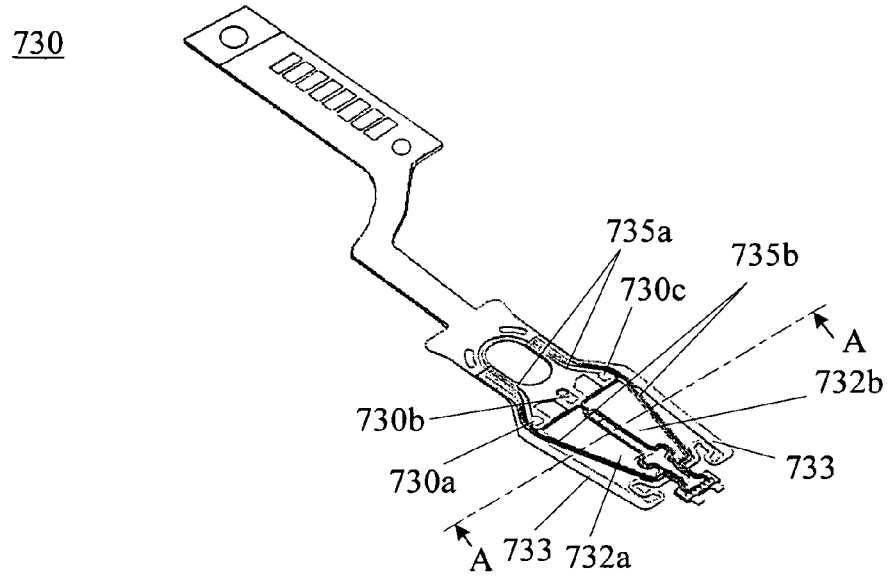
FIG. 3a is a perspective view of a flexure formed according to a method for manufacturing a head gimbal assembly of the present invention.
Figure 3B:
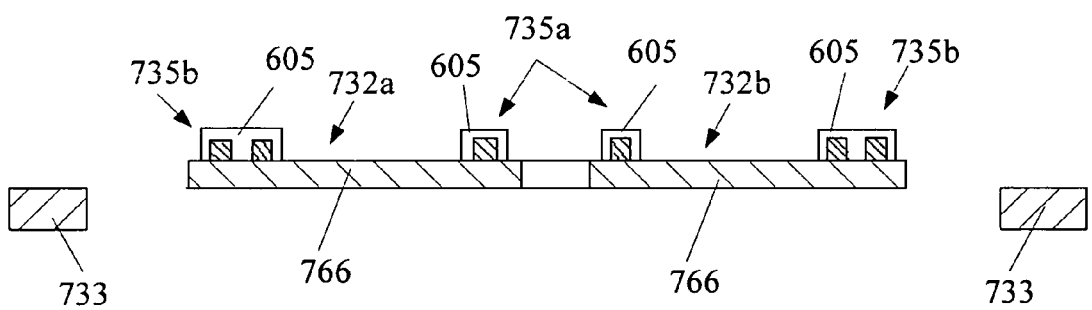

FIG. 3a specifically illustrates the flexure 730 of the head gimbal assembly 300. FIG. 3b is a sectional view of the flexure 730 of FIG. 3a taken along line A-A. The flexure 730 is formed on a sheet material and the sheet material forms multiple sets of serially-arranged flexure 730 thereon. Referring to FIGS. 3a-3b, the flexure 730 comprises a tongue region and a pair of strength beams 733 formed at two sides of the tongue region. The flexure 730 forms a base polymer layer 766 thereon. In addition, the flexure 730 forms a set of inner suspension traces 735a and a set of outer suspension traces 735b and three suspension pads such as left electrical connection pad 730a, common ground pad 730b and right electrical connection pad 730c. The inner suspension traces 735a are formed on the base polymer layer 733 and are adapted to establish electrical connection with the micro-actuator 320 via the left electrical connection pad 730a, common ground pad 730b and right electrical connection pad 730c. The outer suspension traces 735b are formed on the base polymer layer 733 and are adapted to establish electrical connection with the slider. The outer surfaces of the inner suspension trace 735a and the outer suspension trace 735b are covered with polymer 605. The base polymer 766 forms a left PZT holding region 732a and a right PZT holding region 732b. The PZT holding region 732a/732b is positioned between the inner suspension trace 735a and the outer suspension trace 735b.

Figure 4A:
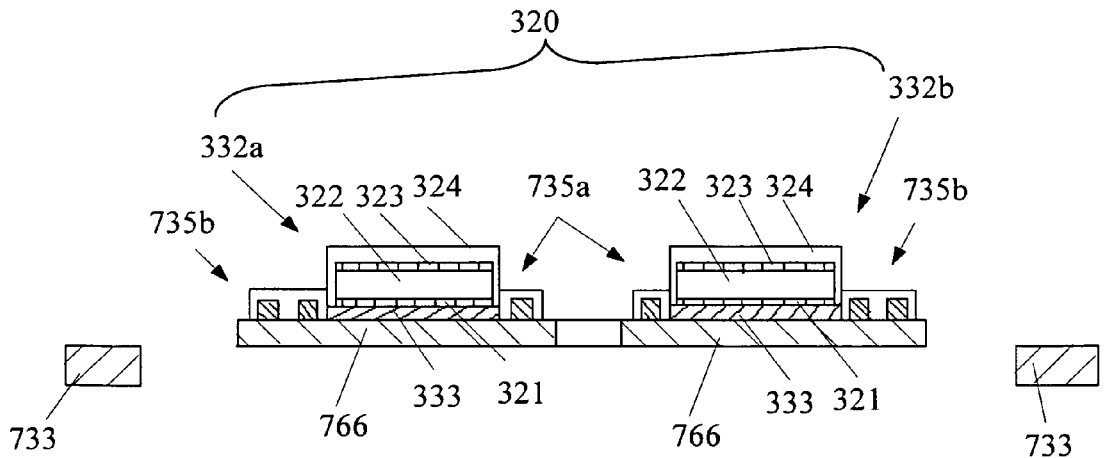
FIG. 4a is a view of a piezoelectric element of single piezoelectric layer being formed on the flexure of FIG. 3b according to the method for manufacturing a head gimbal assembly of the present invention.
Figure 4B:
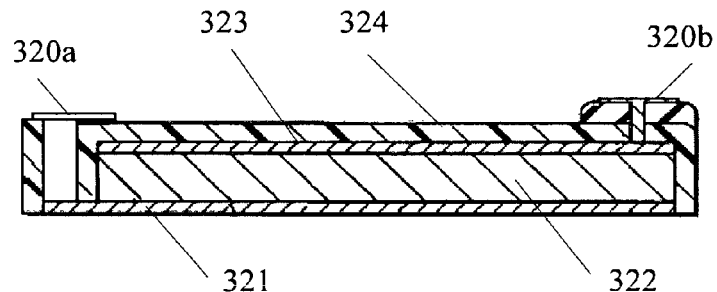
FIG. 4b is a view of electrical pads being formed on a piezoelectric element of FIG. 4a according to the method for manufacturing a head gimbal assembly.
Figure 4C:
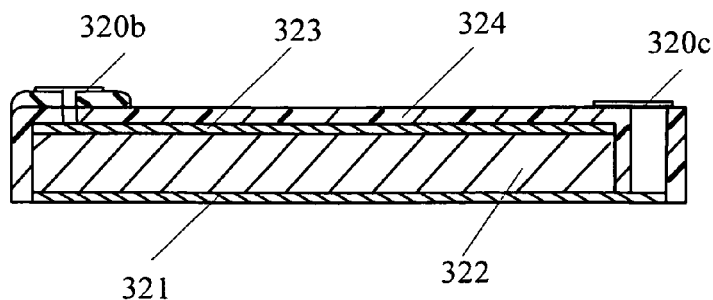
FIG. 4c is a view of electrical pads being formed on the other piezoelectric element of FIG. 4a according to the method for manufacturing a head gimbal assembly.
Figure 4D:
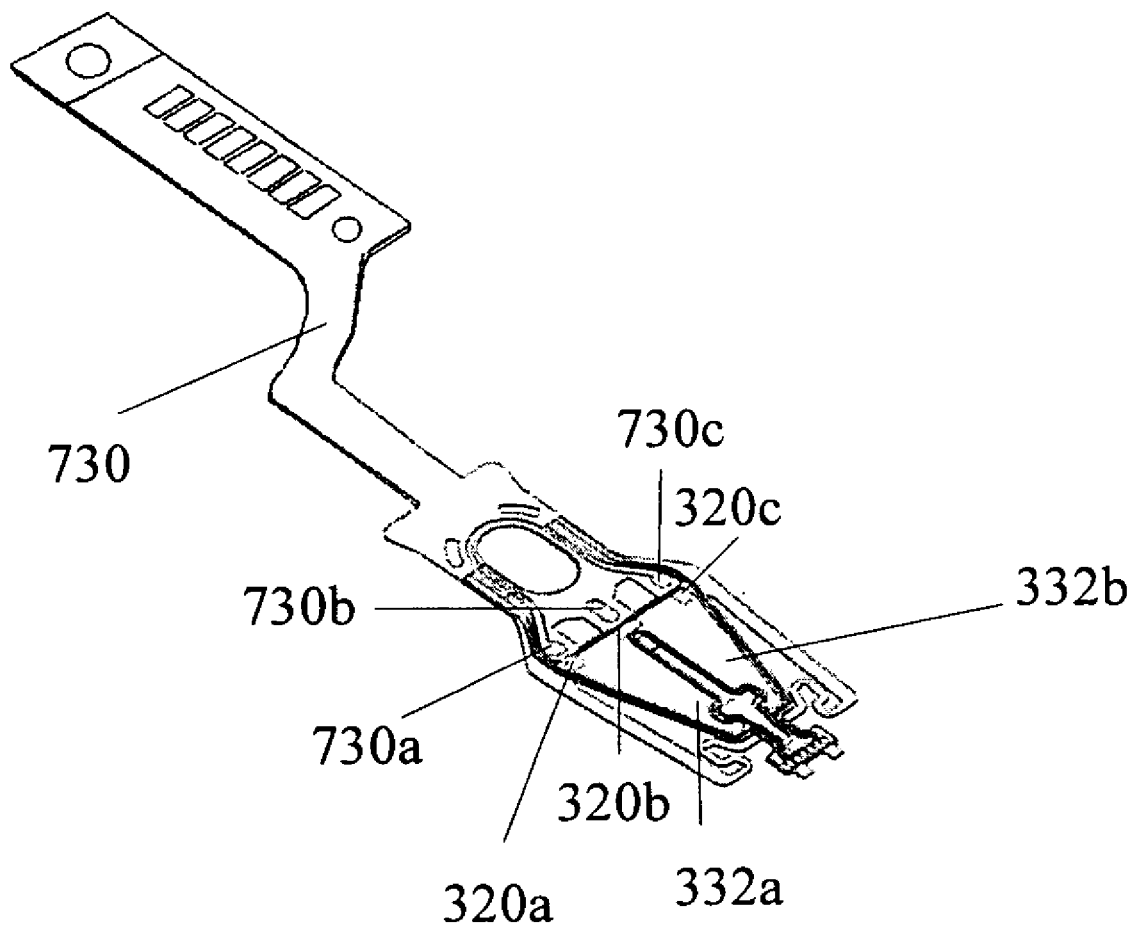
FIG. 4d is an assembled, perspective view of the piezoelectric elements relative to the flexure of FIGS. 4b-4c.

FIGS. 4a-4c show how to simultaneously manufacture and mechanical mounting the micro-actuator 320 to the left, right PZT holding regions 732a, 732b of the base polymer 766 of the flexure 730. As shown in FIG. 4a, the left, right PZT holding region 732a, 732b of the base polymer 766 of the flexure 730 respectively form a seed layer 333, and the seed layer 333 is metallic material, metal oxide, non-metallic material or inorganic salt. And the metallic material is nickel (Ni), titanium (Ti) or strontium (Sr), the metal oxide is nickel oxide, titanium oxide or strontium oxide, the non-metallic material is monocrystaline silicon, the inorganic salt is silicate. The seed layer 33 is formed by chemical deposition such as chemical vapor deposition (CVD), sputtering process, printing process or plating process. Then, a first electrode layer 321 is formed on the seed layer 333, a piezoelectric layer 322 is formed on the first electrode layer 321 and a second electrode layer 323 is formed on the piezoelectric layer 322. The first electrode layer 321 and the second electrode layer 323 may be metal material such as platinum (Pt) or gold. The first electrode layer 321, the piezoelectric layer 322 and the second electrode layer 323 could be formed by chemical deposition such as chemical vapor deposition (CVD), sputtering process, printing process or plating process. In such case, the first electrode layer 321, the piezoelectric layer 322 and the second electrode layer 323 forms a laminated structure. Following that, a protective layer 324 is covered over the surface of the laminated structure and the protective layer 324 is polymer. Thus the piezoelectric element 332a, 332b are respectively formed on the left, right PZT holding regions 732a, 732b of the flexure 730 via seed layer 333 to form a micro-actuator. In the embodiment, the piezoelectric elements 332a, 332b are formed on the flexure 730 of the suspension 330, thus it is not necessary to separately manufacture the piezoelectric elements 332a, 332b and the flexure 730 via individual process and individual factory, and it is also not necessary to mechanically mounting the piezoelectric elements 332a, 332b on the flexure 730 via individual procedure, thereby sharply reducing process time. In addition, the subject embodiment first forms the seed layer on the flexure and then forms piezoelectric element on the seed layer, comparing to the way of connecting the separate-manufactured piezoelectric element with the suspension by adhesive in the prior art, the present invention is easy to control the operation and has simple manufacturing process. In addition, the present invention avoids the separate-manufactured piezoelectric element deformation problem during mounting operation because of fragile property of the piezoelectric element, and the head gimbal assembly manufactured by the present method has high manufacture yield, and sound mechanical, dynamic and static performance.

As shown in FIG. 4b, two electrical pads 320a, 320b are formed and patterned on the left piezoelectric element 332a of the micro-actuator 320. The electrical pad 320a is formed on the first electrode layer 321 of the piezoelectric element 332a, the electrical pad 320b is formed on the second electrode layer 323 of the piezoelectric element 332a. The electrical pads 320a, 320b of the left piezoelectric element 332a extend out of the protective layer 324. Shown in FIG. 4c, two electrical pads 320c, 320b are formed and patterned on the right piezoelectric element 332b of the micro-actuator 320. The electrical pad 320c is formed on the first electrode layer 321 of the piezoelectric element 332b, the electrical pad 320b is formed on the second electrode layer 323 of the piezoelectric element 332b. The electrical pads 320c, 320b of the right piezoelectric element 332b extend out of the protective layer 324. Shown in FIG. 4d, the electrical pads 320a, 320b, 320c of the left, right piezoelectric elements 332a, 332b of the micro-actuator 320 are formed corresponding to the left electrical connection pad 730a, the common ground pad 730b and the right electrical connection pad 730c of the flexure 730.

Figure 5A:
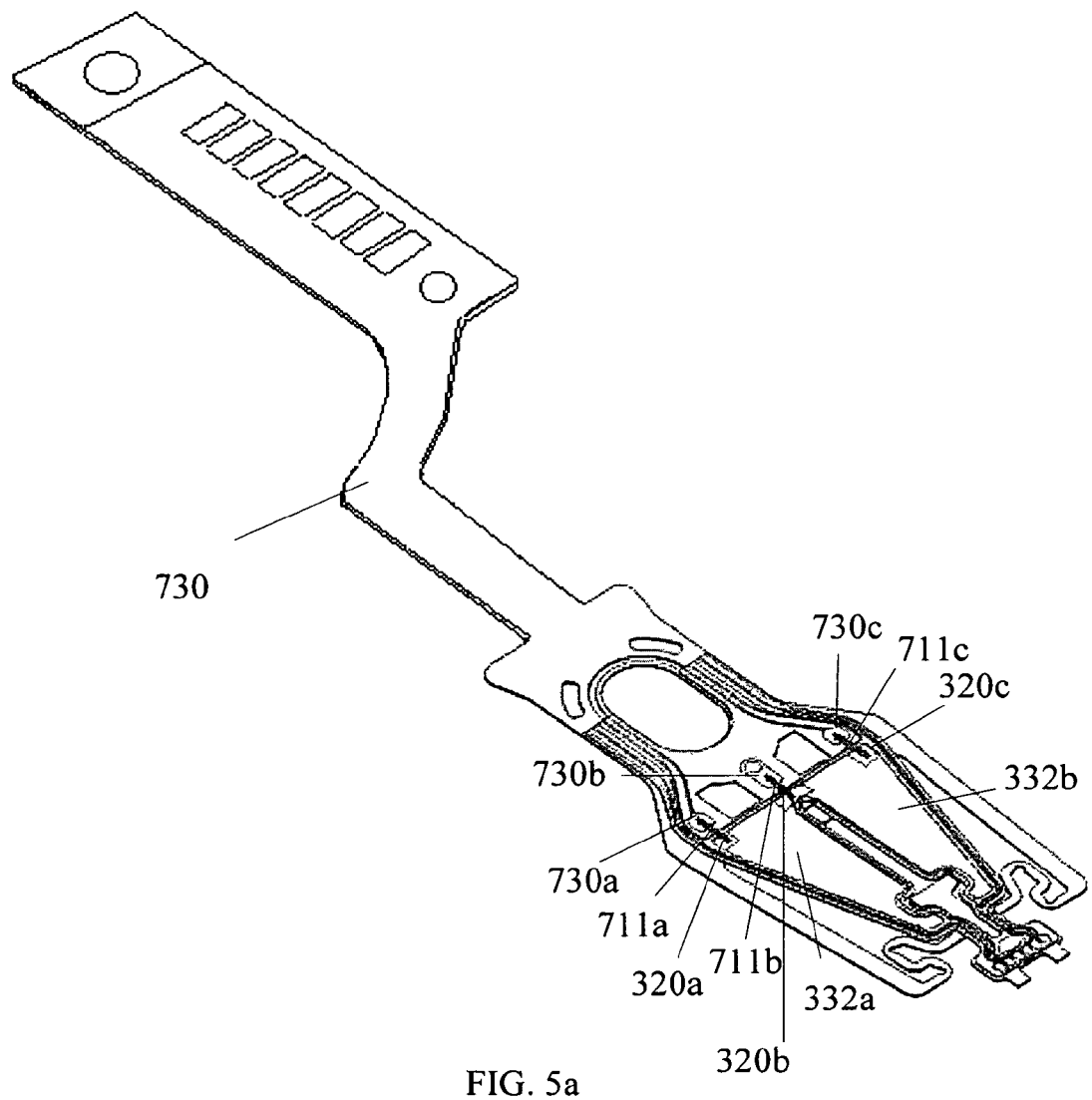
FIG. 5a is a perspective view of establishing electrical connection between electrical pads of the piezoelectric elements and suspension pads of the flexure of FIG. 4d according to the method for manufacturing a head gimbal assembly.
Figure 5B:
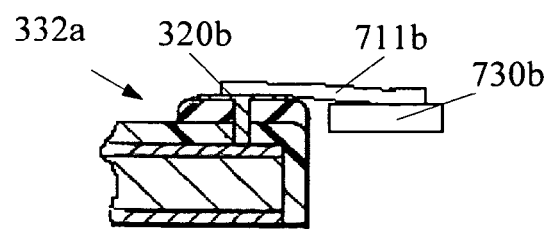

FIG. 5a shows electrical connection relation of the left, right piezoelectric elements 332a, 332b relative to the flexure 730. As shown in FIG. 5a, the electrical pad 320 of the left piezoelectric element 332a is connected with the left electrical connection pad 730a of the flexure 730 via metal material 711a; the electrical pad 320c of the right piezoelectric element 332b is connected with the right electrical connection pad 730c of the flexure via metal material 711c. The two electrical pads 320b of the left, right piezoelectric elements 332a, 332b are connected with the common ground pad 730b of the flexure 730 by metal material 711b. The connection between the electrical pads 320a, 320b, and 320c of the left, right piezoelectric elements 332a, 332b and the left electrical connection pad 730a, the common ground pad 730b, the right electrical connection pad 730c of the flexure 730 is performed by sputtering process, printing process or plating process. FIG. 5b is a partial, enlarged view of electrical connection between the electrical pad 320b of the left piezoelectric element 332a with the common ground pad 730b. As shown in FIG. 5b, the electrical pad 320b is electrically connected with the common ground pad 730b via metal material 711b. After the left, right piezoelectric element 332a, 332b have established electrical connection with the flexure 730, the micro-actuator 320 should be conducted with performance testing so as to test the performance of the left, right piezoelectric element 332a, 332b. As the electrical connection between the piezoelectric elements 332a, 332b and the flexure 730 are performed by sputtering process, printing process or plating process, thus comparing the welding of the prior art, the present invention is easy to control the operation, and has a short process time and a sound connection reliability.

Figure 6A:
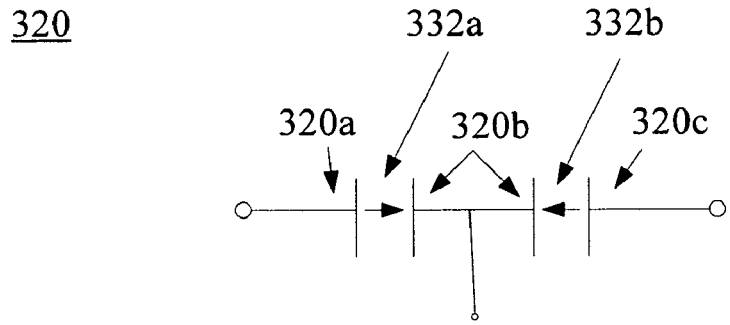
Figure 6B:
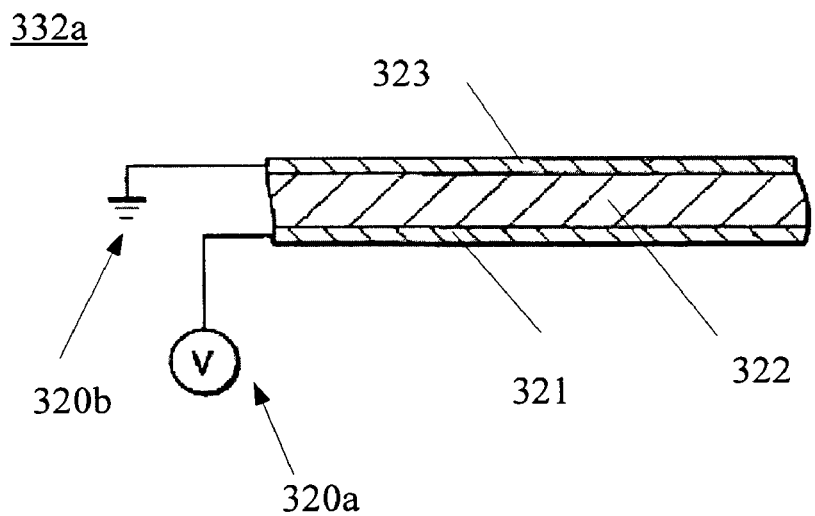
FIG. 6b is a circuit diagram of a piezoelectric element of the electrical connection relation of FIG. 6a, wherein an electrical pad of the piezoelectric element is grounded.

FIG. 6a is an electrical connection relation view of the left, right piezoelectric elements 332a, 332b of the micro-actuator 320. The left, right piezoelectric elements 332a, 332b have opposed polarity and serially connected together. As mentioned above, the electrical pads 320b are connected with the common ground pad 730b, thus the electrical pads 320b are grounded. FIG. 6b is a circuit diagram of the left piezoelectric element 332a of FIG. 6a. As shown in FIG. 6b, a voltage is applied to the electrical pad 320a of the first electrode layer 321 of the left piezoelectric element 332a, and the electrical pad 320b of the second electrode layer 323 is grounded.

Figure 6C:
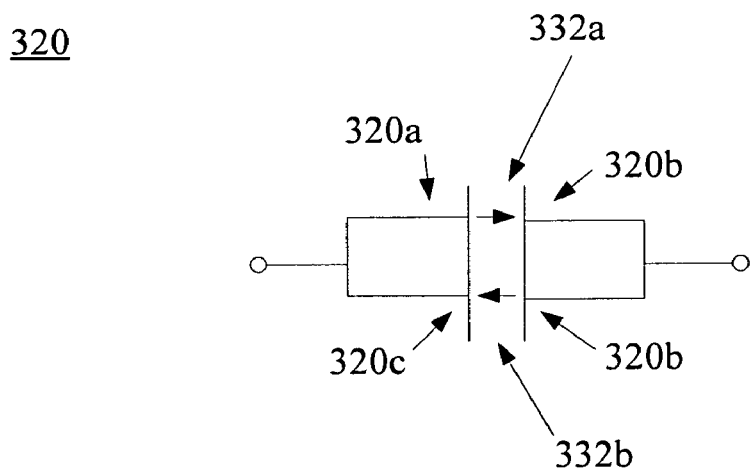
Figure 7:
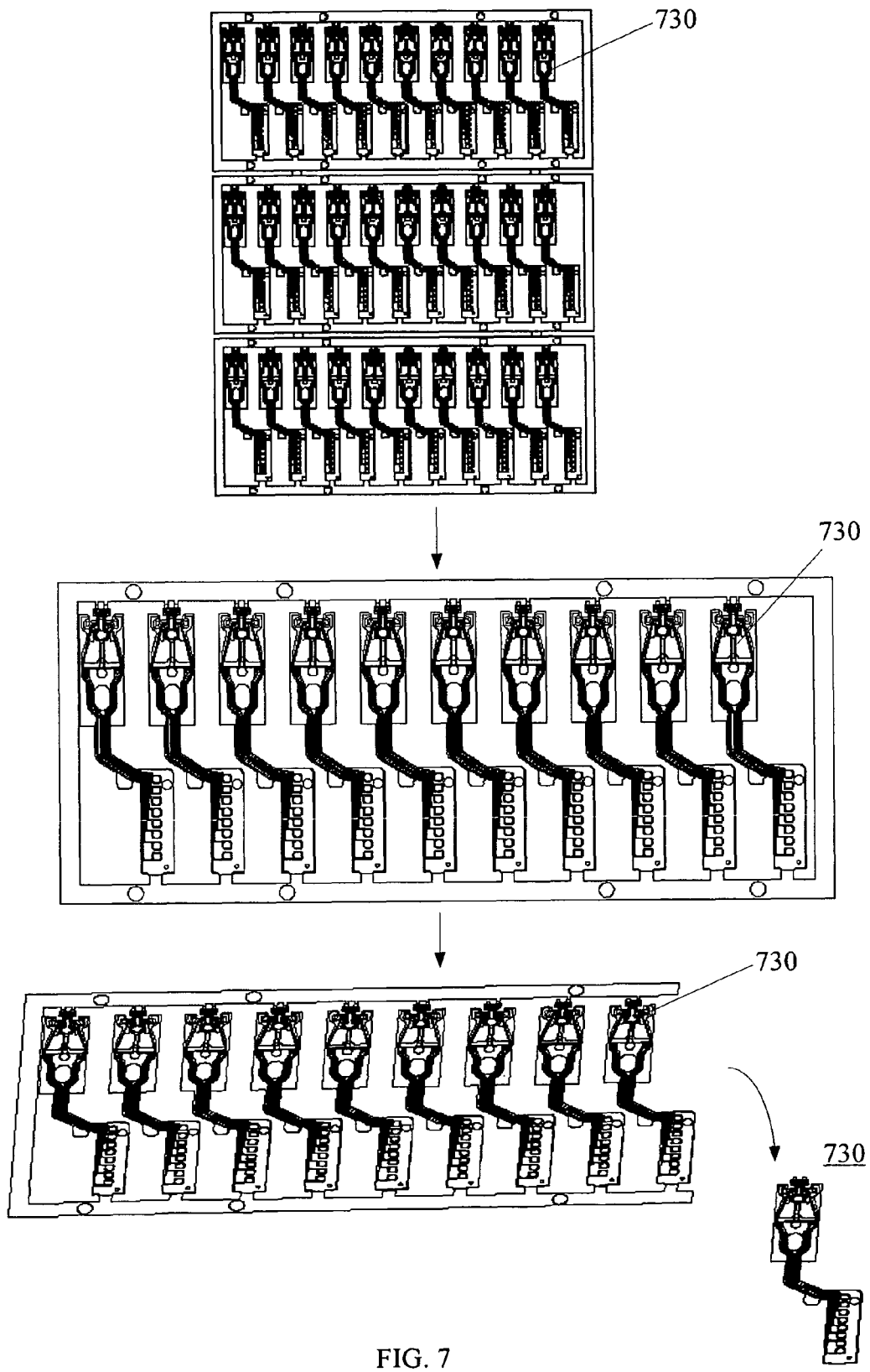
FIG. 7 is a view of manufacturing a single flexure with piezoelectric elements according to the method for manufacturing a head gimbal assembly of the present invention.

FIG. 6c is another electrical connection relation view of the left, right piezoelectric elements 332a, 332b of the micro-actuator 320. The left, right piezoelectric elements 332a, 332b has opposed polarity and parallelly connected together. In this case, the two electrical pads 320 of the left, right piezoelectric element 332a, 332b are dummy pads and thus could be omitted FIG. 7 is a view of manufacturing a single flexure with the micro-actuator 320. As shown in FIG. 7, the sheet material is cut into bars, and the each bar is cut into separate flexure 730. The flexure 730 has formed micro-actuator 320 thereon and the left, right piezoelectric elements 332a, 332b of the micro-actuator 320 have established electrical connection with the flexure 730. Subsequently, the single flexure 730 is assembled with the load beam 430, the base plate 530 and the hinge 630 (shown in FIG. 2a) via standard suspension manufacture process to form the suspension 330. In such case, the flexure 730, the load beam 430 and the base plate 530 are welded together via laser. At this time, the assembly of the head gimbal assembly 300 is finished. Finally, the head gimbal assembly 300 needs to be conducted with performance testing, and the sound head gimbal assembly 300 needs to be cleaned. After cleaned, the head gimbal assembly 300 will be checked and packaged. Performed with such steps, the whole manufacturing process of the head gimbal assembly is finished.

Figure 8:
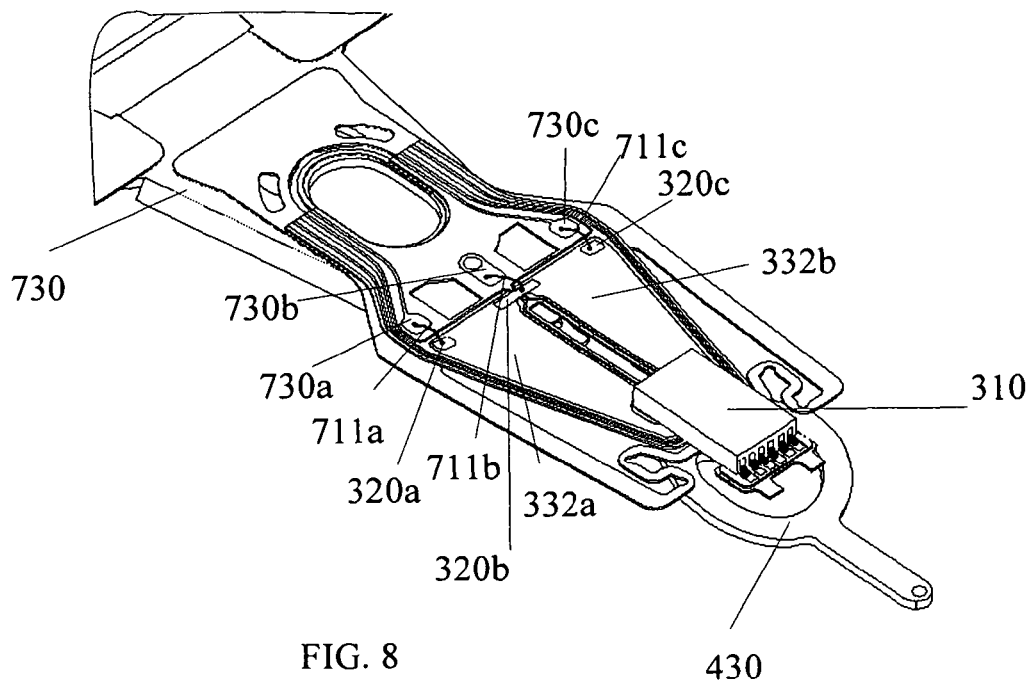
FIG. 8 is a partial, perspective view of a head gimbal assembly manufactured according to the method for manufacturing a head gimbal assembly of the present invention.
Figure 9:
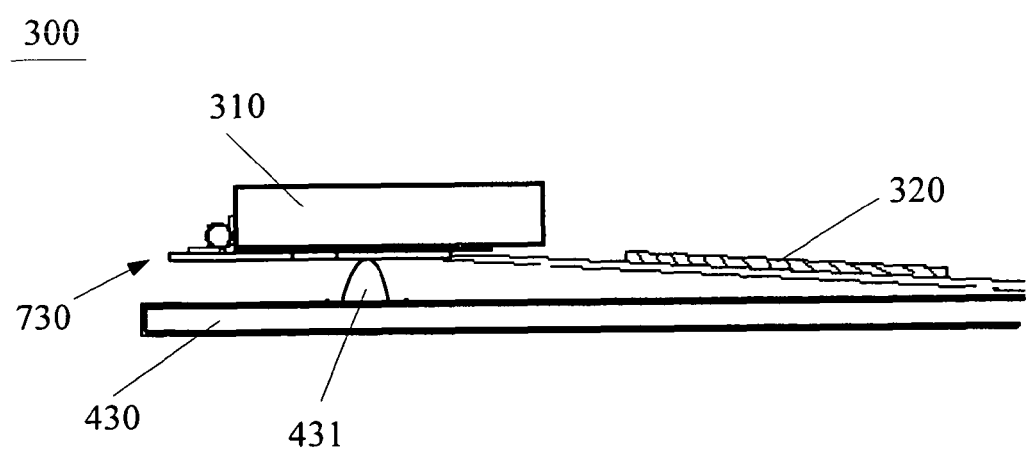
FIG. 9 is a partial, side view of the head gimbal assembly of FIG. 8.

FIG. 8 is a partial, perspective view of a head gimbal assembly 300 after assembled. As shown in FIG. 8, the load beam 430, the base plate 530, the hinge 630 (shown in FIG. 2a) and the flexure 730 are assembled together. The left, right piezoelectric elements 332a, 332b of the micro-actuator 320 are formed on the left, right PZT holding regions 732a, 732b of the flexure 730 of the suspension 330. FIG. 9 is a partial, side view of the head gimbal assembly 300 of FIG. 8. The slider 310 is partially mounted on the flexure 730, and the micro-actuator 320 is formed on the flexure 730. The dimple 431 of the load beam 430 supports the flexure 730. When the slider 310 flies over the disk (not shown), the dimple 431 keeps the load force 430 from the load beam evenly applying to the center of the slider 310, supporting the slider 310 with a good flying stability.

Figure 10:
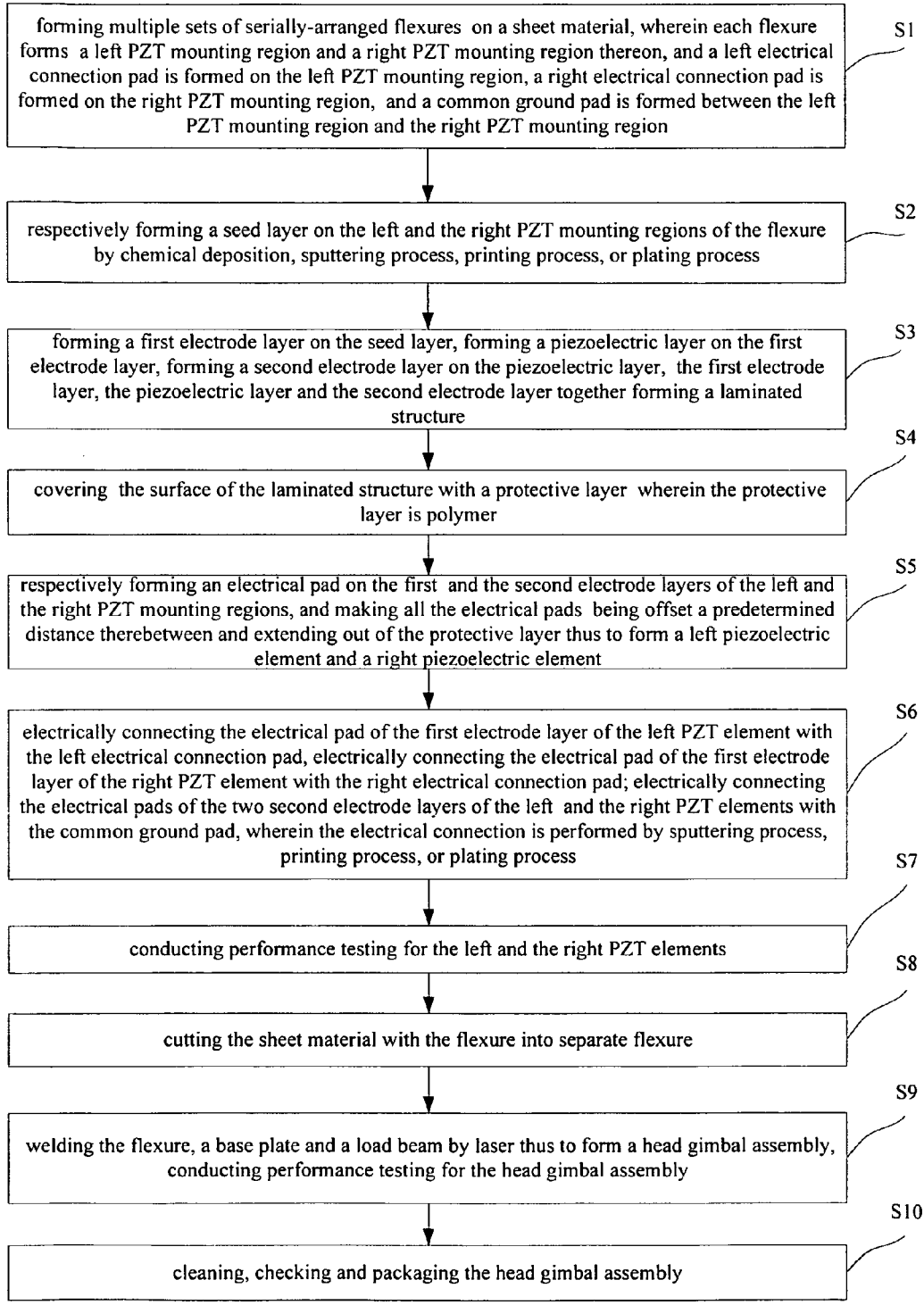
FIG. 10 is a flowchart showing the method for manufacturing a head gimbal assembly of the present invention.

FIG. 10 is a flowchart showing a method for manufacturing a head gimbal assembly according to the present invention. As shown in FIG. 10, the method for manufacturing a head gimbal assembly comprises the steps of: (1) forming multiple sets of serially-arranged flexures on a sheet material, wherein each flexure forms a left PZT mounting region and a right PZT mounting region thereon, and a left electrical connection pad is formed on the left PZT mounting region, a right electrical connection pad is formed on the right PZT mounting region, and a common ground pad is formed between the left PZT mounting region and the right PZT mounting region (step S1); (2) respectively forming a seed layer on the left and the right PZT mounting regions of the flexure by chemical deposition, sputtering process, printing process, or plating process (step S2); (3) forming a first electrode layer on the seed layer, forming a piezoelectric layer on the first electrode layer, forming a second electrode layer on the piezoelectric layer, the first electrode layer, the piezoelectric layer and the second electrode layer together forming a laminated structure (step S3); (4) covering the surface of the laminated structure with a protective layer, wherein the protective layer is polymer (step S4); (5) respectively forming an electrical pad on the first and the second electrode layers of the left and the right PZT mounting regions, and making all the electrical pads being offset a predetermined distance therebetween and extending out of the protective layer thus to form a left piezoelectric element and a right piezoelectric element (step S5); (6) electrically connecting the electrical pad of the first electrode layer of the left PZT element with the left electrical connection pad, electrically connecting the electrical pad of the first electrode layer of the right PZT element with the right electrical connection pad; electrically connecting the electrical pads of the two second electrode layers of the left and the right PZT elements with the common ground pad, wherein the electrical connection is performed by sputtering process, printing process, or plating process (step S6); (7) conducting performance testing for the left and the right PZT elements (step S7); (8) cutting the sheet material with the flexure into separate flexure (step S8); (9) welding the flexure, a base plate and a load beam by laser thus to form a head gimbal assembly, conducting performance testing for the head gimbal assembly (step S9); (10) cleaning, checking and packaging the head gimbal assembly (step S10).

Figure 11:
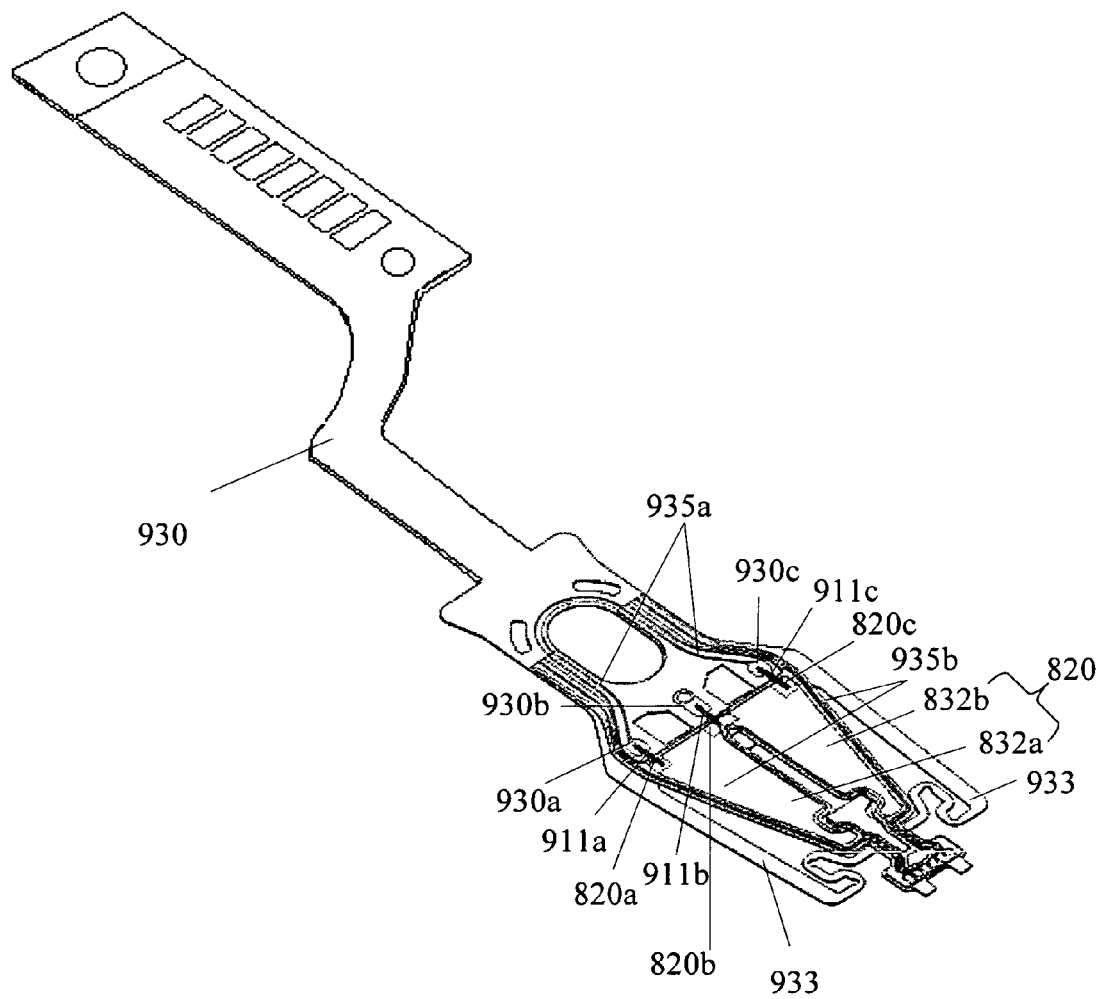
FIG. 11 is a perspective view of a flexure having piezoelectric elements with two piezoelectric layers of the head gimbal assembly of the present invention.
Figure 12A:
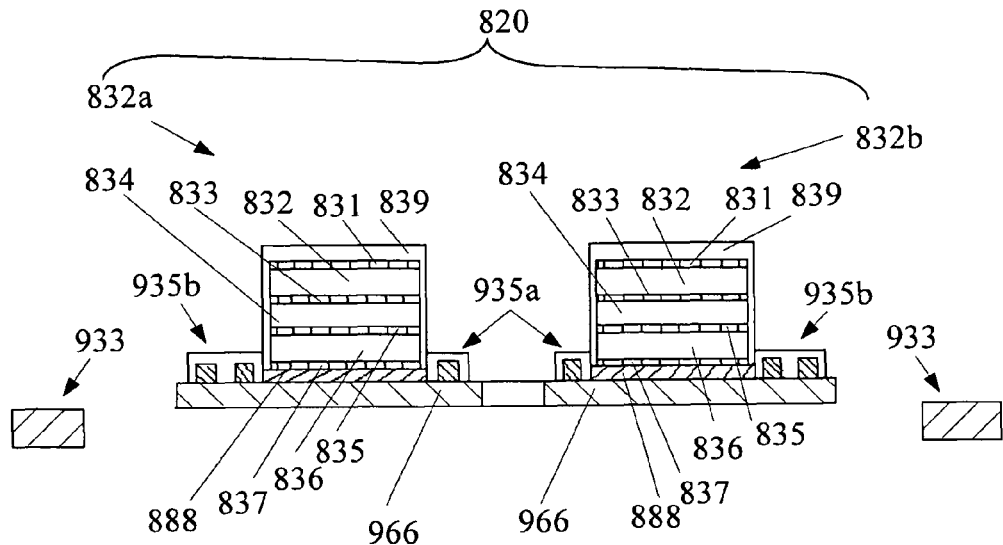
FIG. 12a is a view of a piezoelectric element with two piezoelectric layer being formed on a flexure according to the method for manufacturing a head gimbal assembly of the present invention.

FIGS. 11-13 are structural views of a flexure 930 with micro-actuator 820 having two piezoelectric layers. As shown in FIG. 11, the flexure 930 comprises a tongue region and a pair of strength beams 933 formed at two sides of the tongue region. The flexure 930 forms a base polymer layer 966 (shown in FIG. 12a) thereon. In addition, the flexure 930 forms a set of inner suspension traces 935a and a set of outer suspension traces 935b and three suspension pads such as left electrical connection pad 930a, common ground pad 930b and right electrical connection pad 930c. The inner suspension traces 935a are formed on the base polymer layer 966 and are adapted to establish electrical connection with the micro-actuator 820 via the left electrical connection pad 930a, common ground pad 930b and right electrical connection pad 930c. The outer suspension traces 935b are formed on the base polymer 966 and are adapted to establish electrical connection with the slider. The outer surface of the inner suspension trace 935a and the outer suspension trace 935b is covered with polymer. The base polymer of the flexure 930 forms a left PZT holding region and a right PZT holding region (not shown) thereon. The PZT holding regions are positioned between the inner suspension trace 935a and the outer suspension trace 935b. The micro-actuator 820 comprises two piezoelectric elements, that is, the left piezoelectric element 832a and the right piezoelectric element 832b. The left, right piezoelectric elements 832a, 832ab are respectively formed on the left, right PZT holding regions of the base polymer 966 of the tongue of the flexure 930, and each comprise two piezoelectric layers.

FIG. 12 is a view of forming piezoelectric elements 832a, 832b with two piezoelectric layers on the flexure 930 according to the method for manufacturing a head gimbal assembly of the present invention, specifically illustrating how to simultaneously manufacture and mechanical mounting the micro-actuator 820 to the left, right PZT holding regions of the base polymer 966 of the flexure 930. As shown in FIG. 12, the left, right PZT holding regions of the base polymer 966 of the flexure 930 respectively form an seed layer 888, and the seed layer 888 is metallic material, metal oxide, non-metallic material or inorganic salt. The metallic material is nickel, titanium or strontium, the metal oxide is nickel oxide, titanium oxide or strontium oxide, the non-metallic material is monocrystaline silicon, the inorganic salt is silicate. The seed layer 888 is formed by chemical deposition such as chemical vapor deposition (CVD), sputtering process, printing process, or plating process. Subsequently, a first electrode layer 837 is formed on the seed layer 888, a first piezoelectric layer 836 is formed on the first electrode layer 837 and a second electrode layer 835 is formed on the first piezoelectric layer 836, an adhesive layer 834 is covered on the second electrode layer 835. A third electrode layer 833 is bonded to the adhesive layer 834 and a second piezoelectric layer 832 is formed on the third electrode layer 833 and a fourth electrode layer 831 is formed on the second piezoelectric layer 832. The first first electrode layer 837, the second electrode layer 835, third electrode layer 833 and the fourth electrode layer 831 may be metal material such as Pt or gold. The first electrode layer 837, the first piezoelectric layer 836, the second electrode layer 835, the adhesive layer 834, the third electrode layer 833, the second piezoelectric layer 832 and the fourth electrode layer 831 together form a multi-layer laminated structure. Following that, a protective layer 839 is covered on the surface of the multi-layer laminated structure and the protective layer 839 is polymer. Thus the piezoelectric elements 882a, 882b of the micro-actuator 820 are respectively formed on the left, right PZT holding regions of the flexure 930 via the seed layer 888. It can be understood that the multi-layer laminated structure of the piezoelectric elements 832a, 832b could be formed by laminating electrode layers and piezoelectric layers alternately. In this case, adjacent piezoelectric layers share one electrode layer.

Figure 12B:
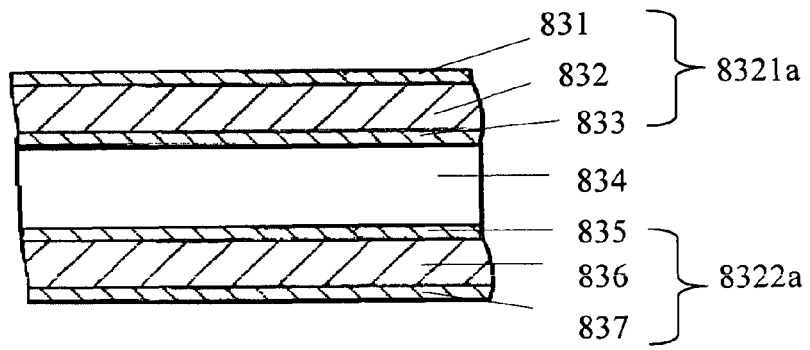
FIG. 12b is a structural view of a piezoelectric element of FIG. 12a, wherein the piezoelectric element has two piezoelectric layers.
Figure 12C:
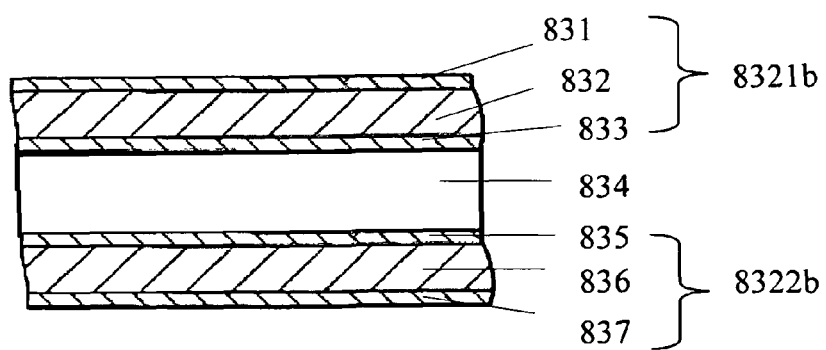
FIG. 12c is a structural view of the other piezoelectric element of FIG. 12a, wherein the piezoelectric element has two piezoelectric layers.

FIG. 12b and FIG. 12c specifically illustrate the multi-layer laminated structures of the piezoelectric elements of FIG. 12a. FIG. 12b shows the multi-layer laminated structure of the left piezoelectric element 832a. The left piezoelectric element 832a comprises two laminated structure 8322a, 8321a, wherein one laminated structure 8322a comprises the first electrode layer 837, the first piezoelectric layer 836 and the second electrode layer 835, the other laminated structure 8321a comprises the third electrode layer 833, the second piezoelectric layer 832 and the fourth electrode layer 831. The second electrode layer 835 is connected with the third electrode layer 833 via the adhesive layer 834 so as to connect the laminated structure 8322a with the laminated structure 8321a together. FIG. 12b shows the multi-layer laminated structure of the right piezoelectric element 832b. The right piezoelectric element 832b comprises a laminated structure 8322b and a laminated structure 8321b. The laminated structure 8322b of the right piezoelectric element 832b is the same as the laminated structure 8322a of the left piezoelectric element 832a, and the laminated structure 8321b of the right piezoelectric element 832b is the same as the laminated structure 8321a of the left piezoelectric element 832a.

Figure 13A:
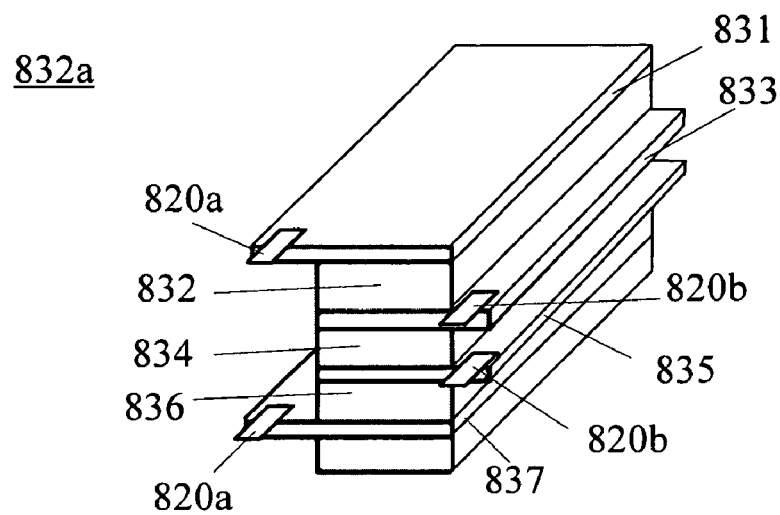
FIG. 13a is a view of electrical pads being formed on a piezoelectric element of FIG. 12b according to the method for manufacturing a head gimbal assembly of the present invention.
Figure 13B:
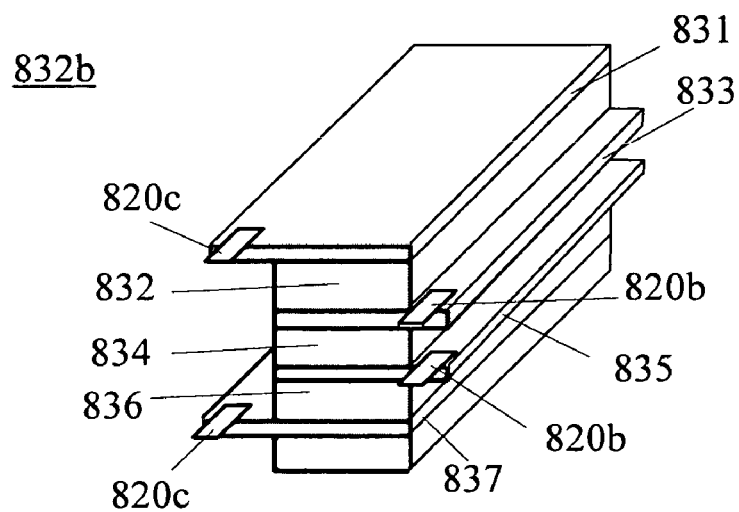
FIG. 13b is a view of electrical pads being formed on the other piezoelectric element of FIG. 12c according to the method for manufacturing a head gimbal assembly of the present invention

FIG. 13a is a view of the left piezoelectric element 832a forming electrical pads thereon according to the method for manufacturing a head gimbal assembly of the present invention. As shown in FIG. 13a, the first electrode layer 837 and the fourth electrode layer 831 of the left piezoelectric element 832a respectively form a pad 820a, the third electrode layer 835 and the second electrode layer 833 of the left piezoelectric element 832a respectively form a pad 820b. In the embodiment, the electrical pads 820a, 820b are offset a predetermined distance and extend out of the protective layer 839. FIG. 13b is a view of the right piezoelectric element 832b forming electrical pads thereon according to the method for manufacturing a head gimbal assembly of the present invention. As shown in FIG. 13b, the first electrode layer 837 and the fourth electrode layer 831 of the right piezoelectric element 832b respectively form a pad 820c, and the third electrode layer 835 and the second electrode layer 833 of the right piezoelectric element 832b respectively form a pad 820b. In the embodiment, the electrical pads 820c, 820b are offset a predetermined distance and extend out of the protective layer 839.

Also referring to FIG. 11, the electrical pads 820 of both the first electrode layer 837 and the fourth electrode layer 831 of the left piezoelectric layer 832a are connected with the left electrical connection pad 930a of the flexure 930 via metal material 911a, the electrical pads 820c of both the first electrode layer 837 and the fourth electrode layer 831 of the right piezoelectric layer 832b are connected with the right electrical connection pad 930c of the flexure 930 via metal material 911c, and the electrical pads 821b of both the second electrode layer 835 and the third electrode layer 833 of the left, right piezoelectric element 832a, 832b are connected with the common ground pad 930b of the flexure 930 via metal material 911b. The metal material 911a, 911b, 911c performing electrical connection is attained by sputtering process, printing process, or plating process. In this case, the electrical connection between the piezoelectric elements 832a, 832b and the flexure 930 is attained.

Figure 14A:
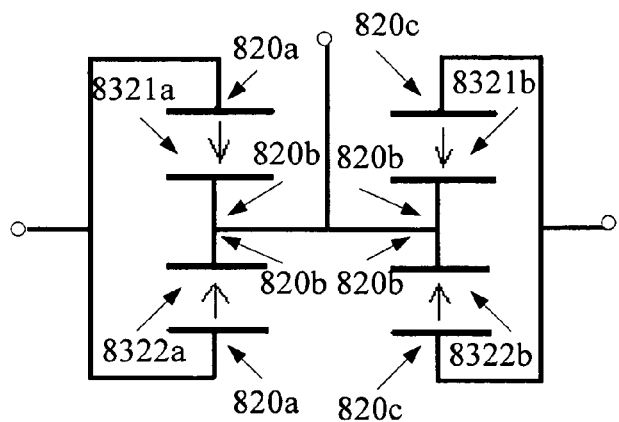
FIG. 14a is an electrical connection relation view of the two piezoelectric elements of FIG. 11.
Figure 14B:
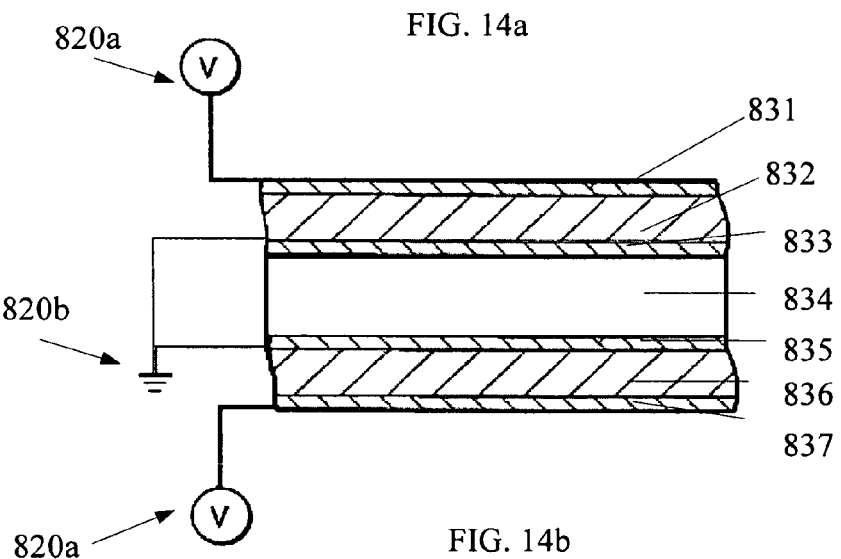
FIG. 14b is a circuit diagram of a piezoelectric element of the electrical connection relation of FIG. 14a, wherein an electrical pad of the piezoelectric element is grounded.

FIG. 14a is an electrical connection relation view of the left, right piezoelectric elements 832a, 832b of the micro-actuator 820. The two laminated structure 8321a, 8322a of the left piezoelectric element 832a are opposed polarity and parallelly connected, the two laminated structure 8321b, 8322b of the right piezoelectric element 832b are opposed polarity and parallelly connected. The left piezoelectric element 832a and the right piezoelectric element 832b are serially connected. As mentioned above, the electrical pad 820b is connected with the common ground pad 930, thus the electrical pad 820b is grounded. FIG. 14b is a circuit diagram of the left piezoelectric element 832a of FIG. 14a. As shown in FIG. 14b, a voltage is applied to the electrical pad 820a of the first electrode layer 837 and the fourth electrode layer 831 of the left piezoelectric element 832a, the electrical pad 320b of the second electrode layer 323 and the third electrode layer 835 are grounded.

Figure 14C:
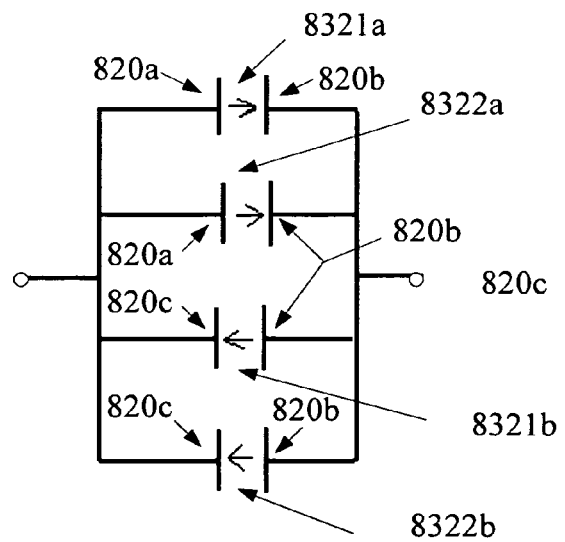
FIG. 14c is another electrical connection relation view of the two piezoelectric elements of FIG. 11.

FIG. 14c is another electrical connection relation view of the left, right piezoelectric element 832a, 832b of the micro-actuator 820. The two laminated structure 8321a, 8322a of the left piezoelectric element 832a are the same polarity and parallelly connected, the two laminated structure 8321b, 8322b of the right piezoelectric element 832b are the same polarity and parallelly connected. The left piezoelectric element 832a and the right piezoelectric element 832b are serially connected. In this case, the two electrical pads 820b of the left, right piezoelectric elements 832a, 832b are dummy pads and thus could be omitted.

It needs to be noted that, if left/right piezoelectric element 832a/832b is required more than two piezoelectric layers, thus forming piezoelectric element on flexure 930 could be performed by covering an adhesive layer on the laminated structure 8321a/8321b which is positioned on the laminated structure 8322a/8322b and then sequentially forming an electrode layer, a piezoelectric layer and another electrode layer on the adhesive layer thus to form another laminated structure. Repeat the above operations to form the laminated structure continually until the number of piezoelectric layers meets the need of requirement. Finally, the whole surface of the laminated structure are covered with a protective layer, thus a desired piezoelectric element is obtained.

Figure 15:
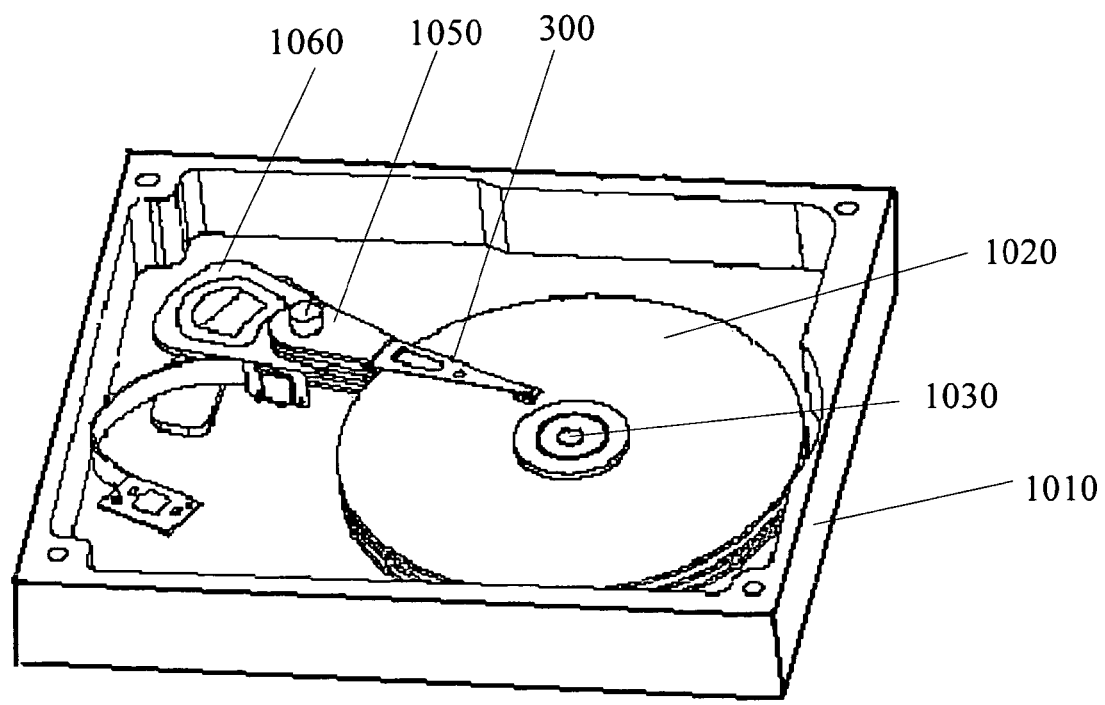
FIG. 15 is a perspective view of a disk drive unit according to the present invention.

FIG. 15 illustrates a disk drive unit according to an embodiment of the present invention. As shown in FIG. 15, the disk drive unit can be attained by assembling a cover 1010, a disk 1020, a spindle motor 1030 to spin the disk 1020, a voice coil motor 1060 and a drive arm 1050 with the head gimbal assembly 300. Because the structure and/or assembly process of disk drive unit of the present invention are well known to persons ordinarily skilled in the art, a detailed description of such structure and assembly is omitted herefrom.

The foregoing description of the present invention has been presented for purposes of illustration and description. It is not intended to be exhaustive or limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A head gimbal assembly, comprising:
   a suspension, the suspension having a flexure, the flexure forming a PZT holding region thereon;
   a seed layer formed on the PZT holding region, the seed layer being metallic material, metal oxide, non-metallic material, or inorganic salt; and
   a piezoelectric element deposited on the seed layer, the piezoelectric element being electrically connected with the suspension to form a PZT micro-actuator; wherein:
   the piezoelectric element comprises a single-layer laminated structure, and the single-layer laminated structure has a first electrode layer formed on the seed layer, a piezoelectric layer formed on the first electrode layer and a second electrode layer formed on the piezoelectric layer, and the surface of the single-layer laminated structure is covered with a protective layer, and the protective layer is polymer;
   an electrical pad is respectively formed on the first electrode layer and the second electrode layer, and all the electrical pads are extend out of the protective layer;
   the PZT holding region comprises a left PZT holding region and a right PZT holding region, the left and the right PZT holding regions both form the seed layer, the first electrode layer, the piezoelectric layer and the second electrode layer, a left electrical connection pad is formed on the left PZT holding region, a right electrical connection pad is formed on the right PZT holding region;

the electrical pad of the first electrode layer on the left PZT holding region is connected with the left electrical connection pad via a sputtering process, printing process, or plating process;

the electrical pad of the first electrode layer on the right PZT holding region is connected with the right electrical connection pad via sputtering process, printing process, or plating process; and the electrical pads of the two second electrode layers on the left and the right PZT holding regions are connected to together.

2. The head gimbal assembly according to claim 1, wherein the piezoelectric element comprises a multi-layer laminated structure, and the multi-layer laminated structure is formed by laminating electrode layers and piezoelectric layers alternately.

3. The head gimbal assembly according to claim 2, wherein the surface of the multi-layer laminated structure is covered with a protective layer, and the protective layer is polymer.

4. The head gimbal assembly according to claim 1, wherein the metallic material is nickel, titanium or strontium, the metal oxide is nickel oxide, titanium oxide or strontium oxide the non-metallic material is monocrystalline silicon, and the inorganic salt is silicate.

5. The head gimbal assembly according to claim 1, wherein the seed layer is formed by any one of the following ways:
   (a) chemical deposition;
   (b) sputtering process;
   (c) printing process;
   (d) plating process.

6. The head gimbal assembly according to claim 1, wherein the suspension further comprises a load beam and a base plate, and the flexure, the load beam and the base plate are welded together via laser.

7. A method for manufacturing a head gimbal assembly, the method comprising:
   (1) providing a suspension, the suspension having a flexure, and the flexure providing a PZT holding region thereon;
   (2) forming a seed layer on the PZT holding region of the flexure;
   (3) forming a first electrode layer on the seed layer;
   (4) forming a piezoelectric layer on the first electrode layer;
   (5) forming a second electrode layer on the piezoelectric layer, the first electrode layer, the piezoelectric layer and the second electrode layer forming a laminated structure; and
   (6) electrically and respectively connecting the first electrode layer and the second electrode layer with the suspension via a sputtering process, printing process, or plating process;
   wherein the method further comprises, between (5) and (6):
      covering the surface of the laminated structure with a polymer protective layer; and
      respectively forming an electrical pad on the first electrode layer and the second electrode layer and making all the electrical pads extend out of the protective layer;
   the PZT holding region comprises a left PZT holding region and a right PZT holding region, the left and the right PZT holding regions both form the seed layer, the first electrode layer, the piezoelectric layer and the second electrode layer, a left electrical connection pad is formed on the left PZT holding region, a right electrical connection pad is formed on the right PZT holding region;
   wherein the connection in (6) is performed by:
      connecting the electrical pad of the first electrode layer on the left PZT holding region with the left electrical connection pad;
      connecting the electrical pad of the first electrode layer on the right PZT holding region with the right electrical connection pad; and
      connecting the electrical pads of the two second electrode layers on the left and the right PZT holding regions together.

8. The method for manufacturing a head gimbal assembly according to claim 7, wherein the seed layer is metallic material, metal oxide, non-metallic material, or inorganic salt.

9. The method for manufacturing a head gimbal assembly according to claim 8, wherein the metallic material is nickel, titanium or strontium, the metal oxide is nickel oxide, titanium oxide or strontium oxide, the non-metallic material is monocrystalline silicon, and the inorganic salt is silicate.

10. The method for manufacturing a head gimbal assembly according to claim 7, wherein the seed layer, the first electrode layer, the piezoelectric layer and the second electrode layer in (2)-(5) are formed by any one of the following ways:
   (a) chemical deposition;
   (b) sputtering process;
   (c) printing process;
   (d) plating process.

11. The method for manufacturing a head gimbal assembly according to claim 7, further comprising, between (5) and (6):
   (51) forming a second piezoelectric layer on the second electrode layer; and
   (52) forming a fourth electrode layer on the second piezoelectric layer,
   wherein (6) further comprises: electrically connecting the fourth electrode layer with the suspension.

12. The method for manufacturing a head gimbal assembly according to claim 7, further comprising, between (5) and (6):
   (51) covering the second electrode layer with an adhesive layer;
   (52) forming a third electrode layer on the adhesive layer;
   (52) forming a second piezoelectric layer on the third electrode layer; and
   (53) forming a fourth electrode layer on the second piezoelectric layer, the third electrode layer, the second piezoelectric layer and the fourth electrode layer also forming a laminated structure,
   wherein (6) further comprises: electrically connecting the third electrode layer and the fourth electrode layer with the suspension.

13. The method for manufacturing a head gimbal assembly according to claim 12, further comprising, between (5) and (6): covering the surface of the laminated structure with a polymer protective layer; and respectively forming an electrical pad on the first, the second, the third and the fourth electrode layers, wherein all the electrical pads are offset a predetermined distance therebetween and extend out of the protective layer,
   wherein (6) is performed by electrically connecting the electrical pads with the suspension via sputtering process, printing process, or plating process.

14. The method for manufacturing a head gimbal assembly according to claim 13, wherein the PZT holding region comprises a left PZT holding region and a right PZT holding region, the left and the right PZT holding regions both form the seed layer, the first electrode layer, the piezoelectric layer, the second electrode layer, the third electrode layer, the second piezoelectric layer and the fourth electrode layer, a left electrical connection pad is formed on the left PZT holding region, a right electrical connection pad is formed on the right PZT holding region, a common ground pad is formed between the left PZT holding region and the right PZT holding region, the connection in (6) is performed by: connecting the electrical pads of the first and the fourth electrode layers on the left PZT holding region with the left electrical connection pad, connecting the electrical pads of the first and the fourth electrode layers on the right PZT holding region with the right electrical connection pad, connecting the electrical pads of the two pairs of the second and the third electrode layers on the left and the right PZT holding regions with the common ground pad.

15. The method for manufacturing a head gimbal assembly according to claim 13, wherein the PZT holding region comprises a left PZT holding region anda right PZT holding region, the left and the right PZT holding regions both form the seed layer, the first electrode layer, the piezoelectric layer, the second electrode layer, the third electrode layer, the second piezoelectric layer and the fourth electrode layer, a left electrical connection pad is formed on the left PZT holding region, a right electrical connection pad is formed on the right PZT holding region, the connection in (6) is performed by: connecting the electrical pads of the first and the fourth electrode layers on the left PZT holding region with the left electrical connection pad, connecting the electrical pads of the first and the fourth electrode layers on the right PZT holding region with the right electrical connection pad, connecting the electrical pads of the two pairs of the second and the third electrode layers on the left and the right PZT holding regions together.

16. The method for manufacturing a head gimbal assembly according to claim 7, further comprising: welding the flexure with a load beam and a base plate via laser.

17. A method for manufacturing a head gimbal assembly, the method comprising:
  (1) providing a suspension, the suspension having a flexure, and the flexure providing a PZT holding region thereon;
  (2) forming a seed layer on the PZT holding region of the flexure;
  (3) forming a first electrode layer on the seed layer;
  (4) forming a piezoelectric layer on the first electrode layer;
  (5) forming a second electrode layer on the piezoelectric layer, the first electrode layer, the piezoelectric layer and the second electrode layer forming a laminated structure; and
  (6) electrically and respectively connecting the first electrode layer and the second electrode layer with the suspension,
  wherein the method further comprises, between (5) and (6): covering the surface of the laminated structure with a polymer protective layer; respectively forming an electrical pad on the first electrode layer and the second electrode layer and making all the electrical pads extend out of the protective layer, and
  wherein (6) is performed by electrically connecting the electrical pads with the suspension via a sputtering process, printing process, or plating process, and
  wherein the PZT holding region comprises a left PZT holding region and a right PZT holding region, the left and the right PZT holding regions both form the seed layer, the first electrode layer, the piezoelectric layer and the second electrode layer, a left electrical connection pad is formed on the left PZT holding region, a right electrical connection pad is formed on the right PZT holding region, a common ground pad is formed between the left PZT holding region and the right PZT holding region, the connection in (6) is performed by: connecting the electrical pad of the first electrode layer on the left PZT holding region with the left electrical connection pad; connecting the electrical pad of the first electrode layer on the right PZT holding region with the right electrical connection pad; connecting the electrical pads of the two second electrode layers on the left and the right PZT holding regions with the common ground pad.

18. A disk drive unit, comprising:
  a head gimbal assembly;
  a drive arm connected to the head gimbal assembly;
  a disk; and
  a spindle motor to spin the disk;
  wherein the head gimbal assembly comprises:
  a suspension, the suspension having a flexure, the flexure forming a PZT holding region thereon;
  a seed layer formed on the PZT holding region, the seed layer being metallic material, metal oxide, non-metallic material, or inorganic salt; and
  a piezoelectric element deposited on the seed layer, the piezoelectric element being electrically connected with the suspension to form a PZT micro-actuator; wherein:
  the piezoelectric element comprises a single-layer laminated structure, and the single-layer laminated structure has a first electrode layer formed on the seed layer a piezoelectric layer formed on the first electrode layer and a second electrode layer formed on the piezoelectric layer;
  an electrical pad is respectively formed on the first electrode layer and the second electrode layer, and all the electrical pads are extend out of the protective layer;
  the PZT holding region comprises a left PZT holding region and a right PZT holding region, the left and the right PZT holding regions both form the seed layer, the first electrode layer, the piezoelectric layer and the second electrode layer, a left electrical connection pad is formed on the left PZT holding region, a right electrical connection pad is formed on the right PZT holding region;
  the electrical pad of the first electrode layer on the left PZT holding region is connected with the left electrical connection pad via sputtering process, printing process, or plating process;
  the electrical pad of the first electrode layer on the right PZT holding region is connected with the right electrical connection pad via a sputtering process, printing process, or plating process; and
  the electrical pads of the two second electrode layers on the left and the right PZT holding regions are connected to together.

* * * * *